United States Patent
Cai et al.

(10) Patent No.: US 11,508,041 B2
(45) Date of Patent: Nov. 22, 2022

(54) METHOD AND APPARATUS FOR RECONSTRUCTING A POINT CLOUD REPRESENTING A 3D OBJECT

(71) Applicant: InterDigital VC Holdings, Inc., Wilmington, DE (US)

(72) Inventors: Kangying Cai, Rennes (FR); Julien Ricard, Cesson-Sevigne (FR); Celine Guede, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/753,773

(22) PCT Filed: Oct. 3, 2018

(86) PCT No.: PCT/US2018/054075
§ 371 (c)(1),
(2) Date: Apr. 4, 2020

(87) PCT Pub. No.: WO2019/070791
PCT Pub. Date: Apr. 11, 2019

(65) Prior Publication Data
US 2020/0258202 A1    Aug. 13, 2020

(30) Foreign Application Priority Data

Oct. 6, 2017 (EP) ..................................... 17306350

(51) Int. Cl.
*G06T 5/00* (2006.01)
*G06T 9/40* (2006.01)
*G06T 19/00* (2011.01)

(52) U.S. Cl.
CPC ............... *G06T 5/005* (2013.01); *G06T 9/40* (2013.01); *G06T 19/00* (2013.01); *G06T 2210/56* (2013.01)

(58) Field of Classification Search
CPC ...... G06T 19/00; G06T 2210/56; G06T 5/005; G06T 9/001; G06T 9/40
See application file for complete search history.

(56) References Cited

U.S. PATENT DOCUMENTS

| 4,979,111 A | * | 12/1990 | Nishimura | ............ | G01T 1/2985 |
| | | | | | 378/14 |
| 2005/0225439 A1 | * | 10/2005 | Watanabe | ............. | G01S 13/931 |
| | | | | | 340/435 |

(Continued)

FOREIGN PATENT DOCUMENTS

WO    WO 2010004466 A1    1/2010

OTHER PUBLICATIONS

Mekuria et al., "Design Implementation, and Evaluation of a Point Cloud Codec for Tele-Immersive Video", IEEE Transactions on Circuits and Systems for Video Technology, vol. 27, No. 4, Apr. 2017, pp. 828-842.

(Continued)

*Primary Examiner* — Ming Wu
(74) *Attorney, Agent, or Firm* — Condo Roccia Koptiw LLP

(57) ABSTRACT

The present disclosure concerns a method for reconstructing a point cloud representing a 3D object from an inverse-projected point cloud obtained by inverse-projecting at least one depth image of an original point cloud, said at least one depth image being obtained by projecting points of the original point cloud onto at least one surface, said method comprising the steps of detecting at least one missing part in the inverse-projected point cloud, and completing said at least one missing part based on points in the neighborhood of said at least one missing part.

23 Claims, 13 Drawing Sheets

(56) References Cited

U.S. PATENT DOCUMENTS

| | | | |
|---|---|---|---|
| 2008/0256466 A1* | 10/2008 | Salvador | G06T 13/80 |
| | | | 715/762 |
| 2013/0096886 A1* | 4/2013 | Vorobyov | G01C 11/00 |
| | | | 703/1 |
| 2013/0181983 A1* | 7/2013 | Kitamura | G01B 11/24 |
| | | | 345/419 |
| 2013/0251195 A1* | 9/2013 | Chang | G01B 21/16 |
| | | | 382/103 |
| 2017/0193692 A1 | 7/2017 | Huang et al. | |
| 2017/0214943 A1* | 7/2017 | Cohen | H04N 19/62 |
| 2018/0276793 A1* | 9/2018 | Kwon | G06T 7/579 |

OTHER PUBLICATIONS

Anonymous, "High Efficiency Video Coding", Series H: Audiovisual and Multimedia Systems, Infrastructure of Audiovisual Services—Coding of Moving Video, Recommendation ITU-T H.265 Standard, Telecommunication Standardization Sector of ITU, Dec. 2016, pp. 1-664.

* cited by examiner

METHOD AND APPARATUS FOR RECONSTRUCTING A POINT CLOUD REPRESENTING A 3D OBJECT

CROSS REFERENCE TO RELATED APPLICATIONS

This application is the national stage entry under 35 U.S.C. § 371 of International Application PCT/US2018/054075, filed Oct. 3, 2018, which was published in accordance with PCT Article 21(2) on Apr. 11, 2019, in English, and which claims the benefit of European Patent Application No. 17306350.4, filed Oct. 6, 2017.

TECHNICAL FIELD OF THE INVENTION

The present principles generally relate to the reconstruction of a point cloud representing a 3D object from an inverse-projected point cloud (IPPC) and eventually a point cloud associated to an octree based structure, Particularly, but not exclusively, the technical field of the present principles are related to the reconstruction of point cloud that uses a texture and depth projection scheme.

BACKGROUND OF THE INVENTION

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of points usually intended to represent the external surface of a 3D object but also more complex geometries like hair, fur that may not be represented efficiently by other data format like meshes. Each point of a point cloud is often defined by a 30 spatial location (X, Y, and Z coordinates in the 3D space) and possibly by other associated attributes such as color, represented in the RGB or YUV color space for example, a transparency, a reflectance, a two-component normal vector, etc.

In the following, a colored point cloud is considered, i.e. a set of 6-component points (X, Y, Z, R, G, B) or equivalently (X, Y, Z, Y, U, V) where (X,Y,Z) defines the spatial location of a point in a 3D space and (R,G,B) or (Y,U,V) defines a color of this point.

Colored point clouds may be static or dynamic depending on whether or not the cloud evolves with respect to time. It should be noticed that in case of a dynamic point cloud, the number of points is not constant but, on the contrary, generally evolves with time. A dynamic point cloud is thus a time-ordered list of sets of points.

Practically, colored point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such colored point clouds are typically static and huge.

Another use case is in topography and cartography in which, by using 3D representations, maps are not limited to the plane and may include the relief.

Automotive industry and autonomous cars are also domains in which point clouds may be used. Autonomous cars should be able to "probe" their environment to take safe driving decision based on the reality of their immediate neighboring. Typical sensors produce dynamic point clouds that are used by the decision engine. These point clouds are not intended to be viewed by a human being. They are typically small, not necessarily colored, and dynamic with a high frequency of capture. They may have other attributes like the reflectance that is a valuable information correlated to the material of the physical surface of sensed object and may help the decision.

Virtual Reality (VR) and immersive worlds have become a hot topic recently and foreseen by many as the future of 2D flat video. The basic idea is to immerse the viewer in an environment all around him by opposition to standard TV where he can only look at the virtual world in front of him. There are several gradations in the immersivity depending on the freedom of the viewer in the environment. Colored point clouds are a good format candidate to distribute VR worlds. They may be static or dynamic and are typically of averaged size, say no more than a few millions of points at a time.

Point cloud compression will succeed in storing/transmitting 3D objects for immersive worlds only if the size of the bitstream is low enough to allow a practical storage/transmission to the end-user.

It is also crucial to be able to distribute dynamic point clouds to the end-user with a reasonable consumption of bandwidth while maintaining an acceptable (or preferably very good) quality of experience. Similarly to video compression, a good use of temporal correlation is thought to be the crucial element that will lead to efficient compression of dynamic point clouds.

Well-known approaches project a colored point cloud representing the geometry and colors of a 3D object, onto the faces of a cube encompassing the 3D object to obtain videos on texture and depth, and code the texture and depth videos using a legacy encoder such as 3D-HEVC (an extension of HEVC whose specification is found at the ITU website, T recommendation, H series, h265, https://www.itu.int/rec/T-REC-H.265-201802-IannexI).

Some point cloud coding, called hereafter PCC, strategies mixing projection based PCC and octree based PCC have been proved to be very efficient in the sense of rate distortion performance. However, the reconstructed point clouds (after coding of the point cloud into at least one bit stream, transmission of said at least one bit stream and decoding of said at least one bit transmitted stream) generated by such a point cloud codec are usually uncompleted, as shown in FIGS. 1a and 1b.

The uncompleted parts of reconstructed point clouds are generated during different stages of the codec as follows,
 the completely missing parts, which are indicated by the dotted circles in FIGS. 1 and 1b, are usually those parts in the original point cloud which are parallel to the projection directions used in the point cloud codec; thus, they are usually not "seen" by the projection stage of the point cloud encoder; and those parts are usually not big enough to make the octree coding stage put more points around.
 the parts with insufficient points, in other words, insufficient sampling resolution, as indicated by the continuous circles in FIG. 1b, are usually generated by the rate distortion optimization (RDO hereafter) during the octree coding stage.

The visual quality of the reconstructed point clouds is thus impacted.

SUMMARY OF THE INVENTION

A purpose of the invention is to improve the visual quality of reconstructed point clouds generated by a point cloud codec based on projections and octrees.

Another purpose of the invention is to improve the visual quality of reconstructed point clouds by completing the missing parts while minimizing the number of new points added to the reconstructed point clouds without introducing high computational complexity.

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to the reconstruction of point clouds from depth images (and optionally texture images) obtained by projecting a point cloud on surfaces associated with volumes of a structure of projection.

Using a structure of projection puts flexibility on the volume positions to be able to capture occlusions finely.

Preferably, projections on cubes are used for easy implementation.

The present principles relates to a method and a device for reconstructing a point cloud representing a 3D object from an inverse-projected point cloud IPPC obtained by inverse-projecting at least one depth image of an original point cloud, said at least one depth image being obtained by projecting the points of the original point cloud onto at least one surface, said method comprising the steps of:
- detecting at least one missing part in the inverse-projected point cloud, and
- completing said at least one missing part based on points in the neighborhood of said at least one missing part.

This method allows to correct the completely missing parts mentioned in the introductory part of the present application in reference to FIGS. 1a-b.

According to an embodiment, the step of detecting said at least one missing part in the inverse-projected point cloud comprises the sub-steps of:
- detecting, in the inverse-projected point cloud, points called boundary points surrounding said at least one missing part, and
- determining, for each one of said at least one missing part, a group of boundary points surrounding the missing part.

According to an embodiment, the boundary points are points having a number of neighbors in their distance-$S^{Close}$ neighborhood lower than a predefined high threshold and greater than a predefined low threshold. For example, $S^{Close}=1$.

According to an embodiment, the step of detecting said at least one missing part in the inverse-projected point cloud further comprises, before determining a group of boundary points surrounding the missing part, removing the boundary points having less than a predefined number of boundary points in their distance-$S^{Close}$ neighborhood, said predefined number being greater than or equal to $S^{Close}+1$. It allows to remove false boundary points.

According to an embodiment, the step of completing said at least one missing part comprises the step of fulfilling said at least one missing part by adding at least one point along a line connecting two boundary points of said group of boundary points.

According to an embodiment, the point cloud is also reconstructed from a point cloud associated to an octree based structure representative of said original point cloud.

According to an embodiment, the method further comprises the steps of:
- detecting, in the point cloud associated to the octree based structure, under-sampled points, and
- adding new points around the detected under-sampled points.

This method allows to correct the parts with insufficient points mentioned in the introductory part of the present application in reference to FIG. 1a.

According to an embodiment, the step of detecting under-sampled points comprises a step of detecting, in the point cloud associated to the octree based structure, points having a number of neighbors in their distance-$S^{Close}$ neighborhood lower than a predefined threshold and a number of neighbors in their distance-Sfurther neighborhood greater than a predefined threshold, with $S^{further}>S^{Close}$ and wherein the detected points are the under-sampled points.

According to an embodiment, the step of adding new points around the detected under-sampled points comprises:
- determining, for each under-sampled point, a minimal distance Sfill of neighborhood in which the number of points is greater than a predefined threshold, and
- filling the distance-Sfill neighborhood of the under-sampled point by at least one new point.

According to an embodiment, the minimal distance Sfill is equal to 1 when the number of points in the distance-1 neighborhood of the under-sampled point is greater than a predetermined threshold.

According to an embodiment, the method further comprises steps for detecting points of the reconstructed cloud point having no complete plane in their distance-$S^{Close}$ neighborhood and adding at least a point in the distance-$S^{Close}$ neighborhood in order to have a complete plane.

According to an embodiment, the non-complete plane of a point is detected by.
- projecting its distance-$S^{Close}$ neighbors on XOY, YOZ and XOZ planes.
- checking the numbers of three groups of non-overlapped projected distance-$S^{Close}$ neighbors resultant from said 3 projections,
- among said three groups of non-overlapped projected distance-$S^{Close}$ neighbors, none of them has a number of non-overlapped points greater than a predetermined threshold.

According to an embodiment, at least one point is added around a point with un-complete plane around to complete said plane.

According to an embodiment, said at least new point is decided by
- determining a projection from said 3 projections which corresponds to the biggest number of non-overlapped projected points among said 3 projections, and
- adding at least one new point along the projection line where the projected point on the corresponding plane is missing.

According to another embodiment, the uncompleted planes around points are completed by
- checking the number of the distance-$S^{Close}$ neighbors of each non-occupied position,
- determining non-occupied positions to be further processed in step 1, whose number of the distance-$S^{Close}$ neighbors is larger than a predetermined threshold and smaller than a predetermined threshold, adding new points around said non-occupied positions.

According to an embodiment, the inverse-projected point cloud is also obtained by inverse-projecting at least one texture image of the original point cloud, said at least one texture image being also obtained by projecting the points of the original point cloud onto at least one surface.

The specific nature of the present principles as well as other objects, advantages, features and uses of the present principles will become evident from the following description of examples taken in conjunction with the accompanying drawings.

BRIEF DESCRIPTION OF DRAWINGS

In the drawings, examples of the present principles are illustrated. It shows.

Similar or same elements are referenced with the same reference numbers.

DESCRIPTION OF EXAMPLE OF THE PRESENT PRINCIPLES

Figure 1A:
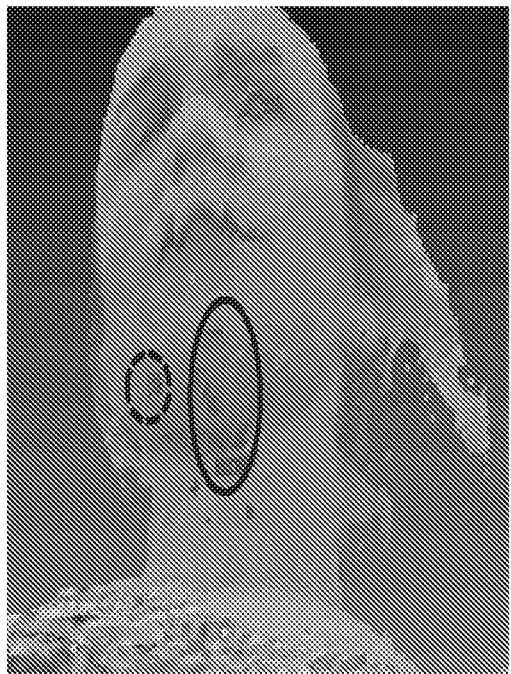
FIGS. 1a and 1b, already described, show examples of reconstructed point clouds comprising missing parts or under-sampled parts.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding a colored point cloud but extends to the encoding/decoding of a sequence of colored point clouds because each colored point cloud of the sequence is sequentially encoded/decoded as described below.

In the following, an image contains one or several arrays of samples (pixel values) in a specific image/video format which specifies all information relative to the pixel values of an image (or a video) and all information which may be used by a display and/or any other device to visualize and/or decode an image (or video) for example. An image comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of nv values, where nv is the number of components. Each value of a vector is represented with a number of bits which defines a maximal dynamic range of the pixel values.

A texture image is an image whose pixel values represents colors of 3D points and a depth image is an image whose pixel values depths of 3D points. Usually, a depth image is a grey levels image.

Figure 2:
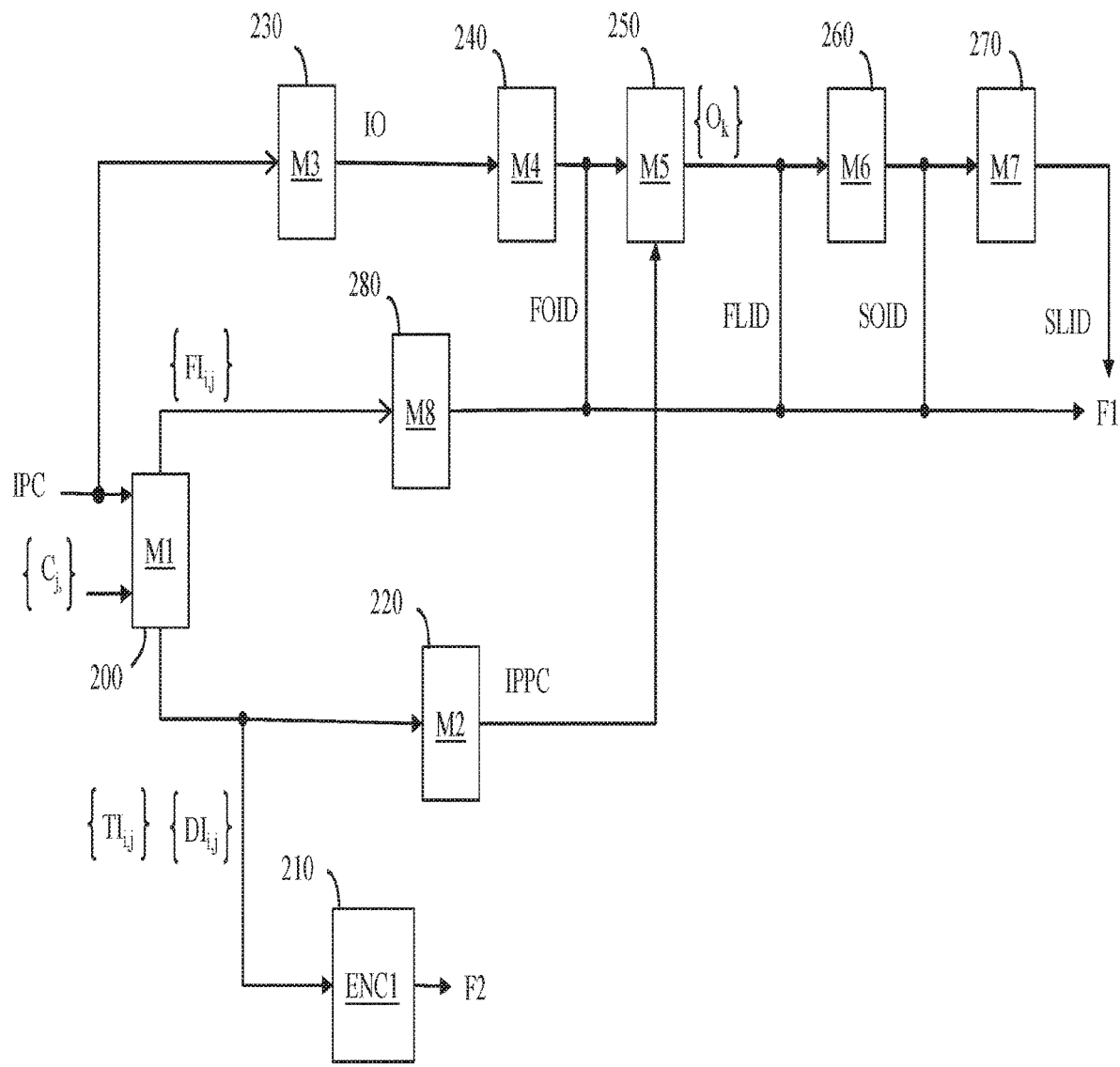
FIG. 2 show schematically a diagram of the steps of the method for encoding a point cloud representing a 3D object in accordance with an example of the present principles.

FIG. 2 shows schematically a diagram of the steps of the method for encoding an input point cloud IPC representing a 3D object.

In step 200, a module M1 obtains at least one depth image ($DI_{i,j}$) by projecting, onto at least one surface $F_{i,j}$ associated with at least one volume $C_j$ of a structure of projection, the points of the input point cloud IPC which are included in said at least one volume $C_j$.

The index i refers to the index of a surface or a depth image associated with a volume, and the index j refers to the index of a volume of said structure of projection.

A volume $C_j$ may be a part of the 3D volume encompassing the whole input point cloud IPC, or said 3D volume. Thus, a structure of projection comprises a set $\{C_j\}$ of at least one volume $C_j$ and at least one surface $F_{i,j}$ associated with a volume $C_j$. Said at least one surface $F_{i,j}$ may be a parametric surface whose parameters are defined in order to optimize the projection of at least a part of the input point cloud IPC onto said parametric surfaces.

According to a preferred embodiment of step 200, a volume $C_j$ is a cube, a surface is a face of said cube and the structure of projection is an octree-based structure of projection. Then, the module M1 obtains at least one depth image ($DI_{i,j}$) by projecting, onto at least one face $F_{i,j}$ of at least one cube $C_j$ of the octree-based structure of projection, the points of the input point cloud IPC which are included in said at least one cube $C_j$. The index i refers to the index (from 1 to 6) of a face or a depth image corresponding to one of the 6 faces of a cube $C_j$.

The surfaces (or faces) $F_{i,j}$ form a set $\{F_{i,j}\}$ of at least one surface (or face), and the depth images $DI_{i,j}$ form a set $\{DI_{i,j}\}$ of at least one depth image.

An octree-based structure comprises a root node, at least one leaf node and possibly intermediate nodes. A leaf node is a node of the octree-based cube which has no child. All other nodes have children. Each node of an octree-based structure is associated with a cube. A leaf cube is a cube associated with a leaf node of an octree-based structure.

An octree-based structure of projection may be obtained by splitting recursively an initial cube associated with the root node and encompassing the input point cloud IPC. Thus, an octree-based structure of projection comprises a set $\{C_j\}$ of at least one cube $C_j$ associated with node(s).

A stopping condition may be checked when a maximum octree depth is reached or when the size of a cube, associated with a node, is smaller than a threshold or when the number of points of the input point cloud 3D included in the cube does not exceed a minimum number.

Figure 3:
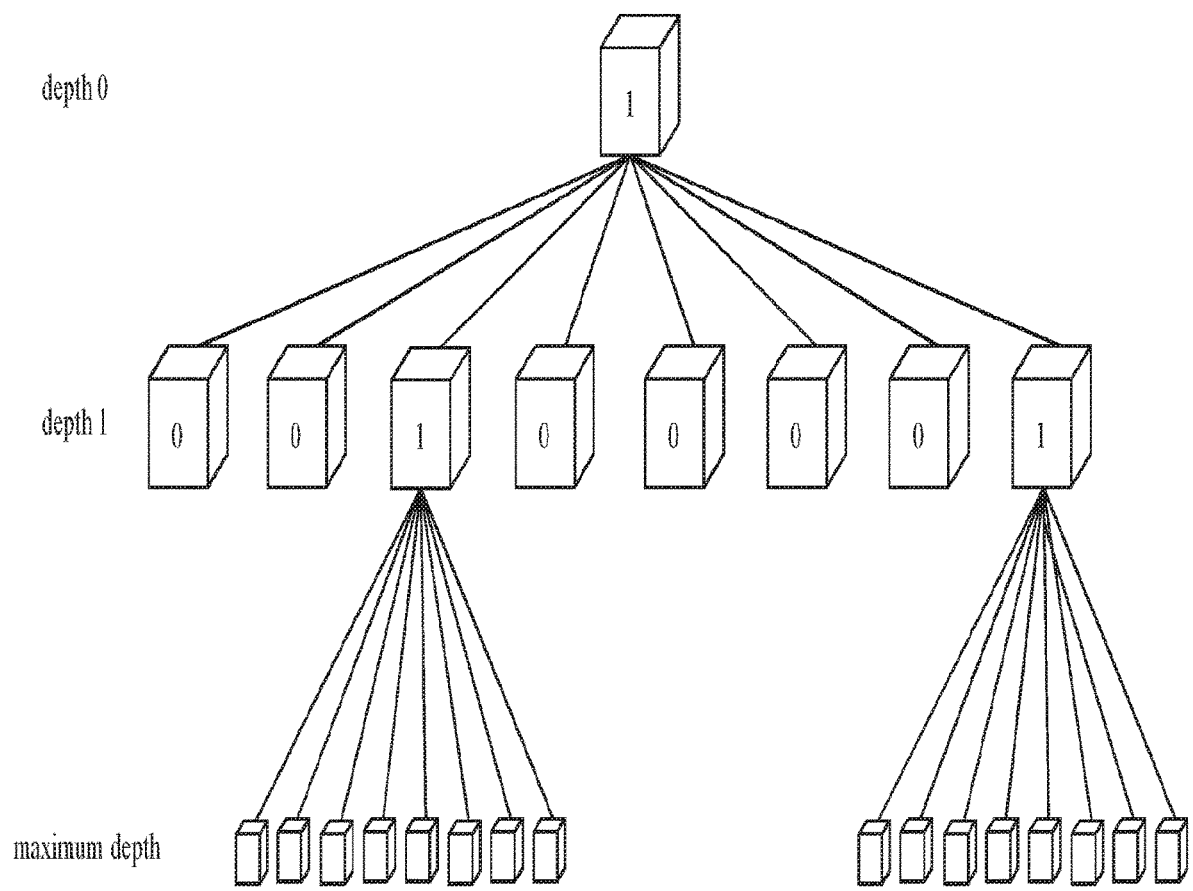
FIG. 3 illustrates an example of an octree-based structure.

In the example illustrated on FIG. 3, the cube associated with the root node (depth 0) is split into 8 sub-cubes (depth 1) and two sub-cubes of depth 1 are then split into 8 sub-cubes (last depth=maximum depth=2).

The sizes of the cubes of a same depth are usually the same but the present principles are not limited to this example. A specific process may also determine different numbers of sub-cubes per depth, when a cube is split, and/or multiple sizes of cubes of a same depth or according to their depths.

In the following, the term "local octree-based structure determined for a cube" refers to an octree-based structure determined in the 3D space delimited by the cube that encompasses a part of the point cloud to be encoded.

In the opposite, a global octree-based structure refers to an octree-based structure determined in a 3D space delimited by the cube that encompasses the point cloud to be encoded.

In step 210, an encoder ENC1 encodes the set $\{DI_{i,j}\}$ least one depth image.

Said at least one encoded depth image may be stored and/or transmitted in a bitstream F2.

In step 220, a module M2 obtains an inverse-projected point cloud IPPC by inverse-projecting said at least one depth image $DI_{i,j}$.

Said inverse projection is the reciprocal process (only for projected points) used in step 200.

According to a variant of step 220, the module M2 uses the encoder ENC1 to encode said at least one depth image $DI_{i,j}$ and obtains the inverse-projected point cloud IPPC by decoding said at least one encoded depth image $DI_{i,j}$ and by inverse-projecting said at least one decoded depth image $DI_{i,j}$.

The inverse-projected point cloud IPPC represents then an approximation of the geometry of the input point cloud IPC.

In step 230, a module M3 determines an octree-based structure IO comprising at least one cube, by splitting recursively a cube encompassing the input point cloud IPC until the leaf cubes, associated with the leaf nodes of said octree-based structure IO, reach down an expected size.

The leaf cubes associated with the leaf nodes of the octree-based structure IO may then include or not points of the input point cloud IPC. A leaf cube associated with a leaf node of the octree-based structure IO is named in the following a Largest Octree Unit ($LOU_k$), k means an index referencing the Largest Octree Unit associated with a leaf node k of the octree-based structure IO.

In step 240, a module M4 encodes a first octree information data FOID representative of the octree-based structure IO.

In step 250, for each $LOU_k$, a module M5 determines if a local octree-based structure $O_k$ is associated with a $LOU_k$ by optimizing a trade-off between a bit-rate $R_{k,n}$ for encoding a candidate octree-based structure $O_{k,n}$ approximating the geometry of points $P_{k,or}$ of the input point cloud IPC which are included in said $LOU_k$, and a distortion $D_{k,n}$ taking into account spatial distances between, on one hand, said points $P_{k,or}$ of the input point cloud IPC, and on the other hand, points $P_{k,n}$ included in leaf cubes associated with leaf nodes of the candidate octree-based structure $O_{k,n}$, and taking into account spatial distances between, on one hand, said points $P_{k,or}$ of the point cloud, and on the other hand, points $P_{k,n}$ included in leaf cubes associated with leaf nodes of the candidate octree-based structure $O_{k,n}$ together with the points $P_{k,IP}$ of the inverse-projected point cloud IPPC which are included in said $LOU_k$.

Mathematically speaking, the distortion $D_{k,n}$ is a metric given by:

$$D_{k,n} = d(P_{k,n} \cup P_{k,IP}, P_{k,OR}) + d(P_{k,OR}, P_{k,n} \cup P_{k,IP})$$

where d(A,B) is a metric that measures the spatial distance from a set of points A to a set of points B. This metric is not symmetric, this means that the distance from A to B differs from the distance from B to A.

The distance $d(P_{k,n} \cup P_{k,IP}, P_{k,OR})$ ensures that the points included in leaf cubes associated with leaf nodes of a candidate octree-based structure $O_{k,n}$ are not too far from the input point cloud IPC, avoiding coding irrelevant points.

The distance $d(P_{k,OR}, P_{k,n} \cup P_{k,IP})$ ensures that each point of the input point cloud IPC is approximated by points not too far from them, i.e. ensures that parts of the input point cloud IPC which are not represented by the inverse-projected point cloud IPPC are well approximated by the points $P_{k,n}$ associated with the octree-based structure $O_{k,n}$.

According to an embodiment, the distance d(A,B) is given by:

$$d(A, B) = \sum_{p \in A} \|p - q_{closest}(p, B)\|_2^2$$

where the norm is the Euclidan distance and $q_{closest}(p, B)$ is the closest point of B from a given point p of A defined as $$q_{closest}(p, B) = \operatorname*{argmin}_{q \in B} \|p - q\|_2^2.$$

According to the optimization process, it may happen that a $LOU_k$ does not include any point of the input point cloud IPC. In that case the $LOU_k$ is named a non-coded $LOU_k$.

It may also happen that the optimization process determines that the points of the input point cloud IPC which are included in the LOUk are not represented (coded) by any candidate octree-based structure $O_{k,n}$. This is the case when the cost for coding those points is too high relatively to the cost associated with $R_{k,n}=0$ and the distortion $D_{k,n}$ obtained between already coded points, from other already coded $LOU_k$ and the inverse projected point cloud IPPC, and $P_{k,OR}$.

In this case, no local octree-based structure $O_k$ is determined for this $LOU_k$ which is then considered as being a non-coded $LOU_k$.

In step 250, for each $LOU_k$, associated with the leaf nodes of said octree-based structure IO, the module M5 also encodes a first leaf node information data FLID indicating if a local octree-based structure $O_k$ has been determined for said $LOU_k$.

For example, this data FLID may be a flag set to 1 if a local octree-based structure $O_k$ is associated to the $LOU_k$, and set to 0 otherwise, i.e. if the $LOU_k$ is a non-coded $LOU_k$.

If a first leaf node information data FLID indicates that a local octree-based structure $O_k$ has been determined for a $LOU_k$, in step 260 a module M6 encodes a second octree information data SOID representative of said determined local octree-based structure $O_k$, and in step 270, a module M7 encodes a second leaf node information data SLID indicating if a leaf cube of said local octree-based structure $O_k$ includes a point representative of a part of the input point cloud IPC.

The first octree information data FOID, the first leaf node information data FLID, the second octree information data SOID and the second leaf node information data SLID may be stored and/or transmitted in a bitstream F1.

Optionally, in step 280, the module M8 encodes projection information data representative of the set of said at least one surface (or face of cube) $F_{i,j}$. Projection information data drive both the projection of the input point cloud IPC onto the surfaces (or faces) and the inverse projection from the surfaces (or faces) to obtain an inverse-projected point cloud IPPC (step 220).

In a variant of step 280, the structure of projection (octree-based structure of projection) may be known beforehand by a decoder, and no information data representative of the structure of projection (octree-based structure of projection) is coded by the module M8.

In another variant of step 280, the module M8 also encodes projection information data representative of the structure of projection (octree-based structure of projection).

The encoded projection information data may be stored and/or transmitted in a bitstream F1.

Figure 4:
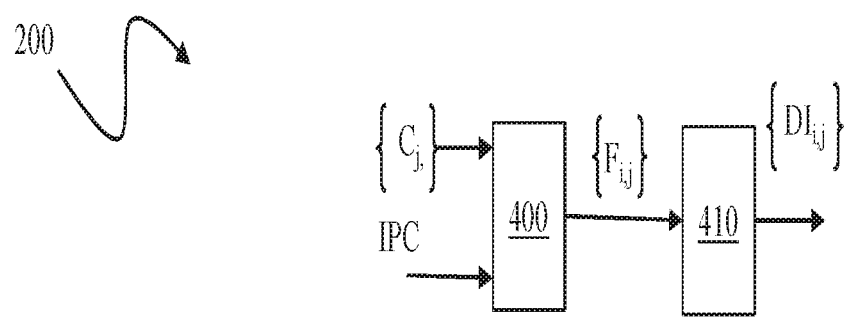
FIG. 4 shows a diagram of the sub-steps of the step 200 of FIG. 2 in accordance with an embodiment of the present principles.

According to an embodiment of step 200, illustrated in FIG. 4, in step 400, the module M1 determines which surfaces $F_{i,j}$ associated with each volume $C_j$ of the set $\{C_j\}$ are selected according to a metric $Q(F_{i,j})$ representative of the capability of a depth images $DI_{i,j}$ associated with a surface $F_{i,j}$ of a volume $C_j$, to efficiently compress the projections of the points of the input point cloud IPC which are included in the volume $C_j$ onto the surface $F_{i,j}$.

In step 410, the module M1 obtains one depth image $DI_{i,j}$ for each selected surface $F_{i,j}$ j by projecting, onto the selected surface $F_{i,j}$ j associated with a volume $C_j$, the points of the input point cloud IPC which are included in the volume $C_j$.

Figure 5:
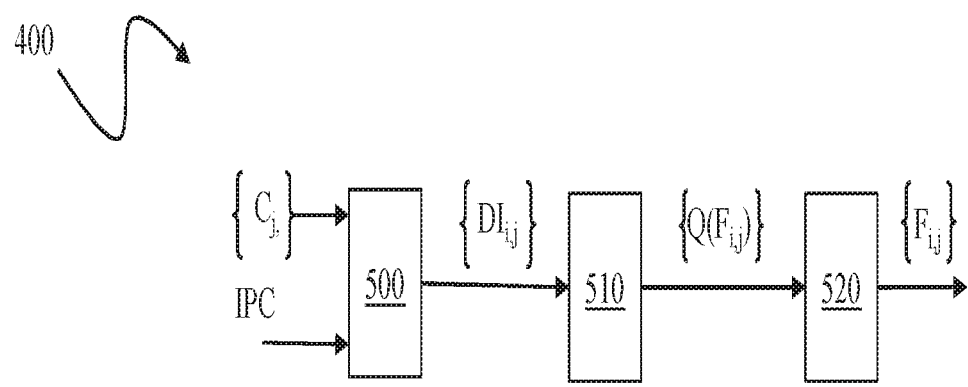
FIG. 5 shows a diagram of the sub-steps of the step 400 of FIG. 4 in accordance with an embodiment of the present principles.

FIG. 5 shows a diagram of the sub-steps of the step 400 in accordance with an embodiment of the present principles.

In step 500, each volume $C_j$ of the structure of projection is considered and the module M1 projects the points of the input point cloud IPC which are included in the volume $C_j$ onto each of the surfaces $F_{i,j}$ associated with said volume $C_j$ in order to obtain a depth image $DI_{i,j}$ for each of said surfaces $F_{i,j}$.

According to a preferred embodiment, the surfaces $F_{i,j}$ may be the six faces associated with a cube $C_j$.

In step 510, the module M1 calculates a metric $Q(F_{i,j})$ for each of the depth images associated with the surfaces $F_{i,j}$.

According to an embodiment, the metric $Q(F_{i,j})$ is responsive to the ratio of the total number N_total(i,j) of pixels, corresponding to the projection of the part of the input point cloud IPC which are included in the volume $C_j$, over the number N_new(i,j) of newly seen points. A point is considered as being "newly seen" when the point has not been projected on a previously selected surface.

If no new point is seen by the projection of the part of the input point cloud IPC onto a surface $F_{i,j}$, said ratio becomes infinite. On the contrary, if all points are new, this ratio is equal to 1.

In step 520, the module M1 selects a surface $F_{i,j}$ when the metric $Q(F_{i,j})$ is lower than or equal to a threshold Q_acceptable:

$$Q(F_{i,j}) \le Q\_acceptable$$

Then, none or at least one surface may be selected per volume.

A possible value is Q_acceptable=2, stating that at least half the projected point should be new to select a projection. It is understood that these examples are not restricted to this specific value that is provided as example only.

According to an embodiment of step 240 and/or 260, the first octree information data FOID and the second octree information data SOID comprises a binary flag per node which equal to 1 to indicate that a cube associated with said node is split and to 0 otherwise.

According to an optional variant of step 240, the module M4 generates a maximum depth of the cube splitting.

This avoids signaling first octree information data for all cubes having the maximum depth.

According to an embodiment of step 250, the first leaf node information data FLID comprises a binary flag per leaf node which equal to 1 to indicate if a local octree-based structure $O_k$ has been determined for a $LOU_k$ and to 0 otherwise (for signaling non-coded $LOU_k$).

According to an embodiment of step 270, the second leaf node information data SLID comprises a binary flag per leaf node which equal to 1 to indicate if a leaf cube of a local octree-based structure $O_k$ includes a point representative of a part of the input point cloud IPC and to 0 otherwise.

According to an embodiment, the first octree information data FOID, the first leaf node information data FLID, the second octree information data SOID and/or the second leaf node information data SLID may be coded using an entropy coder like CABAC (a description of the CABAC is found in the specification of HEVC at http://www.itu.int/recIT-REC-H.265-201612-I/en).

Entropy encoding the second octree information data SOID and/or the second leaf node information data SLID may be efficient in term of coding, because specific contexts may be used to code the binary flags per node because usually only a few nodes of an octree-based structure are split and the probability for the binary flags associated with neighboring nodes to have a same value is high.

Figure 6:
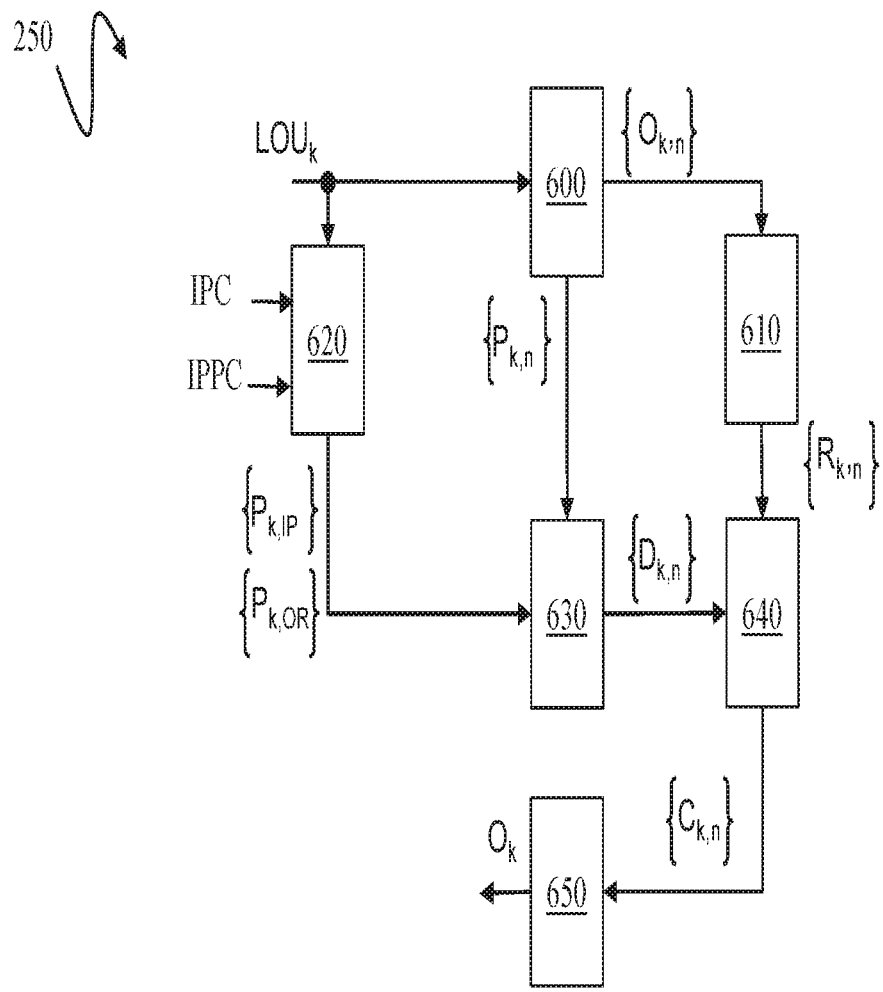
FIG. 6 shows a diagram of the sub-steps of the step 250 of FIG. 2 in accordance with an embodiment of the present principles.

FIG. 6 shows the diagram of the sub-steps of the step 250 in accordance with an embodiment of the present principles.

As discussed above, an octree-based structure IO comprising at least one $LOU_k$ is obtained, and a Rate Distortion optimization (RDO) process is used to determine a best local octree-based structure $O_k$ for at least one $LOU_k$.

A single flag may be encoded in the bitstream F1 to indicate if a $LOU_k$ includes or not a point of the input point cloud IPC.

A RDO process that is performed on an $LOU_k$ may find a best local octree-based structure $O_k$ from N candidate octree-based structures $O_{k,n}$ ($n \in [1; N]$). The basic principle is to test successively each candidate octree-based structure $O_{k,n}$, and for each candidate octree-based structure $O_{k,n}$ to calculate a Lagrangian cost $C_{k,n}$ given by:

$$C_{k,n} = D_{k,n} + \lambda R_{k,n} \quad (1)$$

where $R_{k,n}$ and $D_{k,n}$ are respectively the bit-rate and distortion detailed above, and $\lambda$ is a fixed Lagrange parameter that may be fixed for all the candidate octree-based structures $O_{k,n}$.

The best local octree-based structure $O_k$ is then obtained by minimizing the Lagrangian cost $C_{k,n}$:

$$O_k = \underset{O_{k,n}}{\operatorname{argmin}} C_{k,n}(O_{k,n}) \quad (2)$$

High values for the Lagrangian parameter strongly penalize the bit-rate $R_{k,n}$ and lead to a low quality of approximation, while low values for the Lagrangian parameter allow easily high values for $R_{k,n}$ and lead to high quality of approximation. The range of values for lambda depends on the distortion metric, the size of the $LOU_k$, and most importantly the distance between two adjacent points. Assuming that this distance is unity, typical values for lambda are in the range from a few hundreds, for very poor coding, to a tenth of unity for good coding. These values are indicative and may also depend on the content.

Determining a best local octree-based structure $O_k$ for a $LOU_k$ is now detailed in accordance with an embodiment of the present principles.

In step 600, the module M5 obtains a set of N candidate octree-based structures $O_{k,n}$ for the $LOU_k$ and obtains a set of points $P_{k,n}$ for each candidate octree-based structure $O_{k,n}$. The points $P_{k,n}$ are points which are included in cubes associated with leaf nodes of a candidate octree-based structure $O_{k,n}$.

In step 610, the module M5 obtains the bit-rate $R_{k,n}$ for encoding each candidate octree-based structure $O_{k,n}$.

In step 620, the module M5 obtains points $P_{k,or}$ of the input point cloud IPC which are included in the $LOU_k$ and points $P_{k,IP}$ of the inverse-projected point cloud IPPC.

In step 630, the module M5 obtains a distortion $D_{k,n}$ for each candidate octree-based structure $O_{k,n}$, each distortion $D_{k,n}$ takes into account the spatial distances between, on one hand, the points $P_{k,OR}$ and $P_{k,IP}$, and on the other hand, the points $P_{k,n}$.

In step 640, the module M5 calculates the Lagrangian cost $C_{k,n}$ according to equation (1) for each candidate octree-based structure $O_{k,n}$.

In step 650, the module M5 obtains the best local octree-based structure $O_k$ according to equation (2) once all the candidate octree-based structures $O_{k,n}$ have been considered.

Note that as explained above, it may then consider that the best trade-off for a $LOU_k$ is to not code the points included in it. In that case, no local octree-based structure $O_k$ is determined for this $LOU_k$.

According to an embodiment of step 600, a candidate octree-based structure $O_{k,n}$ comprises at least one leaf node and the leaf cube associated to a leaf node may (or not) include a single point.

Figure 7:
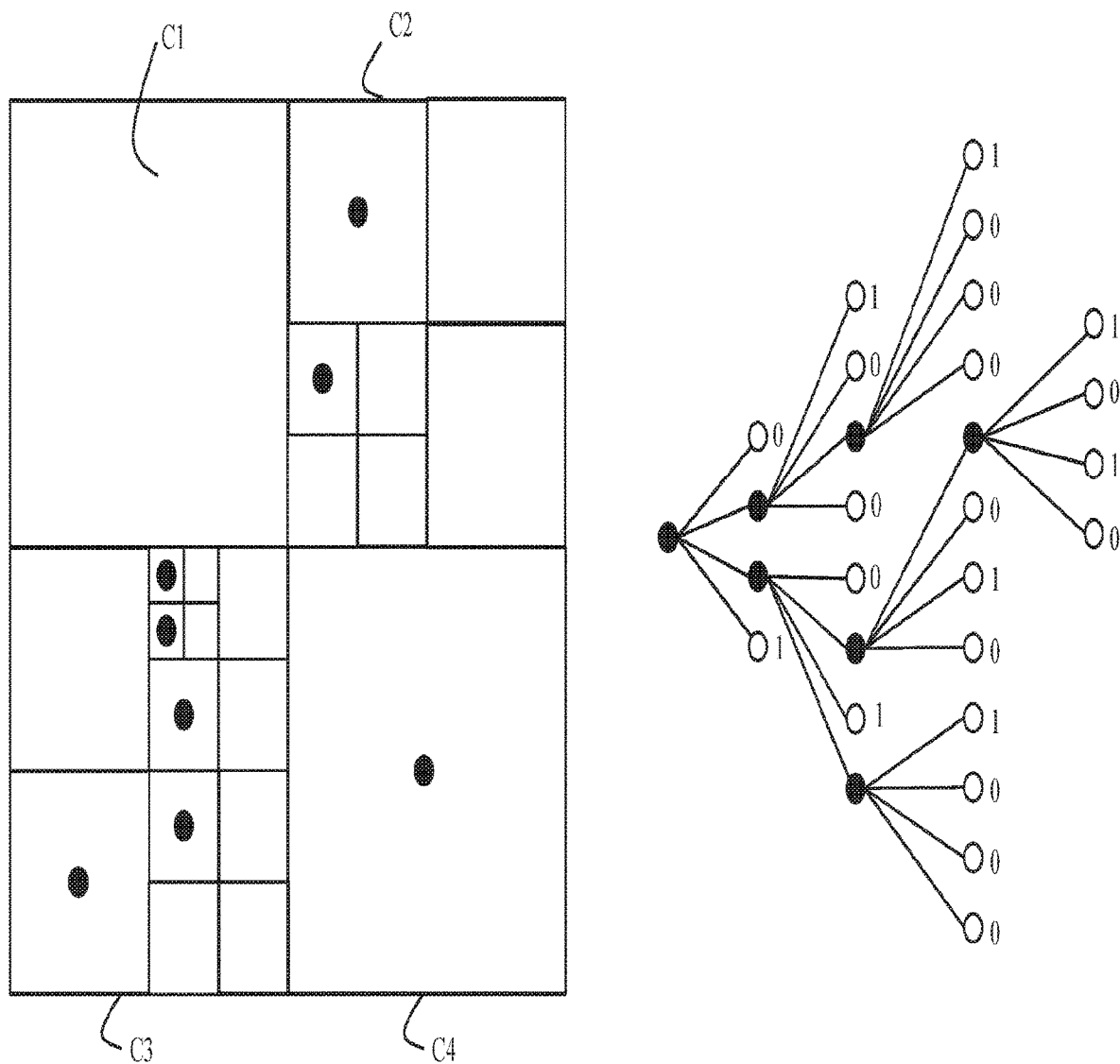
FIG. 7 shows an illustration of an example of a candidate octree-based structure.

FIG. 7 shows an illustration of an example of a candidate octree-based structure $O_{k,n}$ according to this embodiment. This figure represents an example of a quadtree-based structure that splits a square, but the reader will easily extend it to the 3D case by replacing the square by a cube ($LOU_k$).

According to this example, the cube is split into 4 sub-cubes C1, C2, C3 and C4 (depth 1). The sub-cube C1 is associated with a leaf node and does not contain any point. The sub-cube C2 is recursively split into 4 sub-cubes (depth 2). The sub-cube C3 is also recursively split and the sub-cube C4 is not split but a point, located in the center of the cube for example, is associated with it, . . . , etc.

On the right part of FIG. 7 is shown an illustration of the candidate octree-based structure. A black circle indicates that a node is split. A binary flag is associated with each white circle (leaf node) to indicate if the square (a cube in the 3D case) includes (1) or not (0) a point.

According to this example, a point is located in the center of a cube because it avoids any additional information about the spatial location of that point once the cube is identified in the octree-based structure. But the present principles are not limited to this example and may extend to any other spatial location of a point in a cube.

The present principles are not limited to the candidate octree-based structure illustrated on FIG. 7 but extend to any other octree-based structure comprising at least one leaf node whose associated leaf cube includes at least one point.

According to an embodiment of the step 610, when the second octree information data SOID indicates that a cube associated with said node is split and the second leaf node information data SLID indicates if a leaf cube of a local octree-based structure $O_k$ includes a point representative of a part of the input point cloud IPC, the bit-rate $R_{k,n}$ is the sum of the numbers of the binary flags comprised in the second octree information data SOID and the second leaf node information data SLID.

According to another variant of the step 610, a first sequence of the binary flags comprised in the second octree information data SAID and a second sequence of binary flags comprised in the second leaf node information data SLID are formed and entropy-coded and the bit-rate $R_{k,n}$ is then obtained from the entropy-encoded versions of said first and second sequence.

The geometry of the input point cloud IPC is approximated by said at least one depth image obtained by projecting the input point cloud IPC onto surfaces $F_{ij}$ associated with volumes Cj and by the octree-based structures IO and $O_k$.

The colors of the points of the input point cloud IPC may be approximated as described hereinbelow.

According to a variant of the method, in step 200, the module M1 obtains also a texture image ($TI_{i,j}$) per depth image ($DI_{i,j}$) by projecting, onto a surface $F_{i,j}$ associated with a volume $C_j$ of the structure of projection, the points of the input point cloud IPC which are included in said volume $C_j$.

A projection projects points of the input point cloud IPC included in a volume $C_j$ onto a surface $F_{i,j}$ associated with it to create a depth image $DI_{i,j}$ and, optionally, a texture image $TI_{i,j}$.

A projection of the points of the input point cloud IPC onto a surface associated with a volume $C_j$ may be obtained in diverse ways, for example by implementing any one of the following methods:

a parametric linear perspective projection of the points of the input point cloud IPC, which are included in the volume onto a plane $F_{ij}$ associated with a point of view, the parameters representative of the linear perspective projection comprising the location of the virtual camera, the spatial sampling step and the field of view in the 2 dimensions;

a parametric orthographic projection of the points of the input point cloud IPC, which are included in the volume $C_j$, onto a surface $F_{ij}$, the parameters representative of the orthographic projection comprising the geometry (shape, size and orientation) of the projecting surface $F_{ij}$ and spatial sampling step;

LLE (Locally-Linear Embedding) that corresponds to a mathematical operation of dimension reduction, here applied to convert/transform from 3D to 2D, parameters representative of the LLE comprising the transformation coefficients.

Each surface $F_{ij}$ may have advantageously a rectangular shape to ease the encoding process 210 by the module ENC1 on the FIG. 2.

The projection process is not limited to the above described process that is provided as an exemplary embodiment only.

According to a variant of the preferred embodiment of step 200, the module M1 obtains also a texture image $TI_{i,j}$ per depth image $DI_{i,j}$ by projecting, onto a face $F_{i,j}$ of a cube $C_j$ of the octree-based structure of projection, the points of the input point cloud IPC which are included in said cube $C_j$.

The texture images $TI_{i,j}$ are an approximation of the colors of points of the input point cloud IPC.

According to an embodiment, the projection of points of the input point cloud IPC onto a face of a cube is an orthogonal projection.

An orthogonal projection projects points of the input point cloud IPC included in a cube $C_j$ onto one of its face $F_{i,j}$ to create a depth image $DI_{i,j}$ and, optionally, a texture image $TI_{i,j}$. The resolution of the created depth images may be identical to the cube resolution, for instance points in a 16×16×16 cube are projected on a 16×16 pixel image. By permutation of the axes, one may assume without loss of generality that a face is parallel to the XY plane. Consequently, the depth (i.e. the distance to the face) of a point is obtained by the component Z of the position of the point when the depth value Zface of the face equals 0 or by the distance between the component Z and the depth value Zface of the face.

At the start of the projection process, the texture image may have a uniform predetermined color (grey for example) and the depth image may have a uniform predetermined depth value (a negative value –D for instance). A loop on all points included in the cube is performed. For each point at position (X,Y,Z), if the distance Z–Zface of the point to the face is strictly lower than the depth value of the collocated (in the sense of same X and same Y) pixel in the depth image, then said depth value is replaced by Z–Zface and the color of the collocated pixel the texture image is replaced by the color of said point. After the loop is performed on all points, all depth values of the depth image may be shifted by an offset +D. Practically, the value Zface, the origin for X and Y for the face, as well as the cube position relatively to the face, are obtained from the projection information data.

The offset D is used to discriminate pixels of the images that have been projected (depth is strictly positive) or not (depth is zero).

According to an embodiment of the step 210, the encoder ENC1 is a HEVC-like encoder (AVC, H264, H265, etc.).

According to an embodiment of step 210, the encoder ENC1 encodes a depth image by taking into account the texture image associated with said depth image.

According to an embodiment of step 210, the encoder ENC1 is 3D-HEVC compliant (see Annex J of the HEVC specification on coding tools dedicated to the depth). Such an encoder can natively code jointly a texture and its associated depth, with a claimed gain of about 50% in term of compression performance of the depth video. The texture image is backward compatible with HEVC and, consequently, is compressed with the same performance as with the classical HEVC main profile.

According to a variant of step 220, the module M2 uses the encoder ENC1 to encode and decode said at least one depth image ($DI_{i,j}$) and said at least one texture image $TI_{i,j}$ and obtains the inverse-projected point cloud IPPC by decoding said at least one encoded depth image $DI_{i,j}$ and said at least one encoded texture image $TI_{i,j}$ and by inverse-projecting said at least one decoded depth image $DI_{i,j}$ and said at least one decoded texture image $TI_{i,j}$.

The inverse-projected point cloud IPPC represents then an approximation of the geometry and the colors of the input point cloud IPC.

When the projection is a projection on the surface $F_{i,j}$ associated with a volume $C_j$, the inverse projection may correspond to the inverse operations of the hereinabove described projections methods, for example a parametric linear perspective inverse projection, a parametric orthographic inverse projection and/or an inverse Locally-Linear Embedding. The inverse projection performs the inverse projection using the depth information associated with the pixels of the depth image $DI_{i,j}$ to obtain the points part of the inverse-projected point cloud IPPC belonging to the volume $C_j$. The color information associated with the pixels of the texture image $TI_{i,j}$ is assigned to said points to obtain the colors of the point of the inverse-projected point cloud IPPC.

When the projection is an orthogonal projection on the face $F_{i,j}$ of a cube $C_j$, the orthogonal inverse projection, from the face of the cube, determines inverse projected 3D points in the cube from texture and depth images. The resolution of the face may be identical to the cube resolution, for instance points in a 16×16×16 cube are projected on a 16×16-pixel image. By permutation of the axes, one may assume without loss of generality that the face is parallel to the XY plane. Consequently, the depth (i.e. the distance to the face) of a point may be representative of the component Z of the position of inverse projected point. The face is then located at the value Zface of the Z coordinate, and the cube is located at Z greater than Zface. Practically, the value Zface, the origin for X and Y for the face, as well as the cube position relatively to the face, are obtained from the projection information data.

A loop on all pixels of the depth image is performed. For each pixel at position (X,Y) and depth value V, if the value V is strictly positive, then an inverse projected 3D points may be obtained at location (X,Y, Zface+V−D) and the color of the pixel at position (X,Y) in the texture image may be associated to said points. The value D may be the same positive offset as used in the projection process.

The orthogonal inverse projection process is not limited to the above described process that is provided as an exemplary embodiment only.

By orthogonally inverse projecting several decoded texture and depth images, it may happen that two or more inverse projected 3D points belong to exactly the same position of the 3D space. In this case, said points are replaced by only one point, at said position, whose color is the average color taken on all said inverse projected 3D points.

Figure 8:
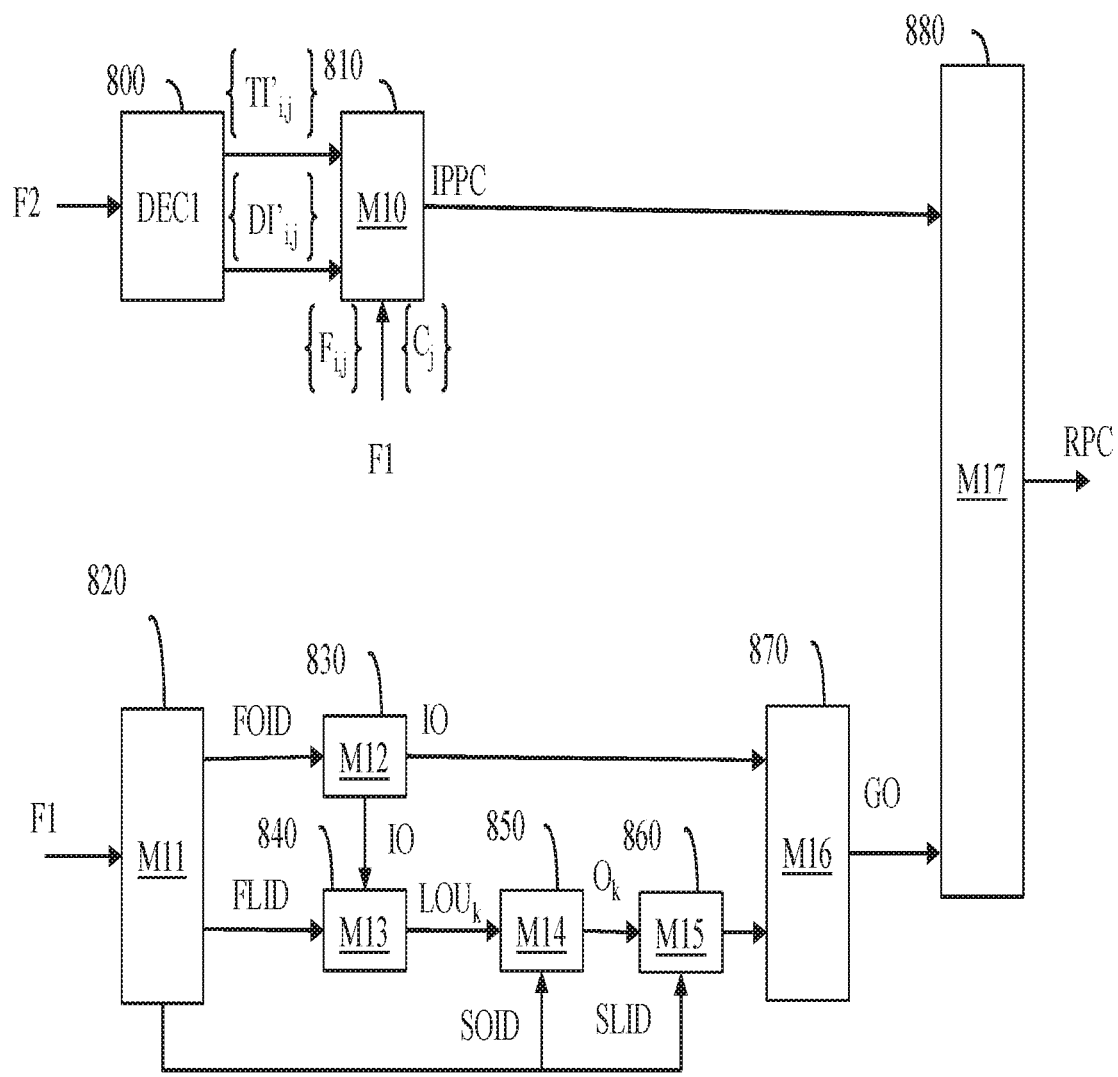
FIG. 8 shows schematically a diagram of the steps of the method for decoding, from at least one bitstream, a colored point cloud representing a 3D object in accordance with an example of the present principles.

FIG. 8 shows schematically a diagram of the steps of the method for decoding, from at least one bitstream, a point cloud representing a 3D object in accordance with an example of the present principles.

In step 800, a decoder DEC1 decodes from a bitstream F2, at least one depth image representative of the spatial locations of at least a part of a point cloud RPC to be decoded.

In step 810, a module M10 obtains an inverse-projected point cloud IPPC by inverse-projecting said at least one decoded depth image $DI'_{i,j}$, said inverse-projection being driven by projection information data representative of at least one surfaces $F_{i,j}$ associated with at least one volume $C_j$ of a structure of projection.

According to a preferred embodiment of step 810, a volume $C_j$ is a cube, a surface is a face of that cube and the structure of projection is an octree-based structure of projection.

Said inverse projection is similar to the process of step 220.

According to a variant of 810, the module M10 decodes projection information data representative of the set of said at least one surface $F_{i,j}$. Projection information data drive the inverse projection from at least one surface to obtain an inverse-projected point cloud IPPC.

In a variant of step 810, the structure of projection may be known beforehand by a decoder.

In a variant of step 810, the module M10 also decodes projection information data representative of the structure of projection (a set of volumes $C_j$ and surfaces $F_{i,j}$ associated with the volumes).

In another variant of step 810, the module M10 also decodes projection information data representative of the structure of projection which is an octree-based structure of projection (a set of cubes $C_j$ and faces $F_{i,j}$ of the cubes).

In step 820, a module M11 decodes, from the bitstream F1, the first octree information data FOID.

In step 830, a module M12 obtains an octree-based structure IO from the first octree information data FOID.

In step 820, the module M11 decodes, from the bitstream F1, a leaf node information data FLID, and in step 840, a module M13 determines if a $LOU_k$ associated with a leaf node of the octree-based structure IO is associated with a local octree-based structure $O_k$ from said first leaf node information data FLID.

If a first leaf node information data FLID indicates that a local octree-based structure $O_k$ has been associated with a $LOU_k$, in step 820, the module M11 decodes, from the bitstream F1, the octree information data SOID and leaf node information data SLID, in step 850 a module M14 obtains a local octree-based structure $O_k$ for said $LOU_k$ from said octree information data SOID, and in step 860, a module M15 determines if a leaf cube of said local octree-based structure $O_k$ includes an leaf point representative of a part of the input point cloud IPC from said leaf node information data SLID. In this case, in step 860, the module M15 adds said leaf point, preferably located at the center of the leaf cube it belongs to, to said local octree-based structure $O_k$.

In step 870, a module M16 obtains a global octree-based structure GO by replacing at least one leaf node of the octree-based structure IO by a local octree-based structure $O_k$.

The global octree-based structure GO is thus formed by all leaf points obtained from the leaf cubes of all local octree-based structure $O_k$ attached to the $LOU_k$.

In step 880, a module M17 obtains the decoded point cloud RPC by fusing said inverse-projected point cloud IPPC and the global octree-based structure GO.

The spatial locations of the points of the decoded point cloud RPC are an approximation of the geometry of the input point cloud IPC.

According to an embodiment, the octree information data FOID, the leaf node information data FLID, the octree information data SOID and/or the leaf node information data SLID may be obtained by entropy-decoding the bitstream F1. The entropy-decoding may be compliant with a CABAC-like coding.

According to a variant of the method, in step 800, the decoder DEC1 decodes from a bitstream F2, a texture image $TI_{i,j}$ per depth image $DI_{i,j}$. At least one pair of decoded texture $TI'_{i,j}$ and decoded depth $DI'_{i,j}$ images is then formed.

According to an embodiment of the step 800, the decoder DEC1 is a HEVC-like decoder (AVC, H264, H265, etc.).

According to an embodiment of step 800, the decoder DEC1 decodes a depth image by taking into account the texture image associated with said depth image.

According to an embodiment of step 800, the decoder DEC1 is 3D-HEVC compliant.

According to a variant of step 810, the module M10 obtains an inverse-projected point cloud IPPC by inverse-projecting said at least one decoded depth image $DI'_{i,j}$, and said at least one decoded texture image $TI_{i,j}$.

The spatial locations of the points of the decoded point cloud RPC are an approximation of the geometry of the input point cloud IPC, and the colors of the points of the inverse-projected point cloud approximate the colors of some points of the input point cloud IPC. The colors of the other points of the decoded point cloud RPC may be obtained by interpolation of the colors of the points of the inverse-projected point cloud.

It may happen that one point of the inverse-projected point cloud IPPC and one other point of the global octree-based structure GO belong to exactly the same position of the 3D space. In this case, these two points are replaced by only one point, at said position, whose color is the average color of the two points.

The geometry and colors of the input point cloud IPC are thus approximated by said decoded point cloud RPC.

The present principles have been described by considering leaf cubes ($LOU_k$) associated with the leaf nodes of an octree-based structure (IO).

According to an embodiment of the encoding and decoding methods, a cube C encompassing at least one point of the input point cloud IPC is considered rather than a $LOU_k$.

The input point cloud IPC is then encoded as follows:

The steps 200-220 remain unchanged and the steps 230 and 240 are removed.

In step 250, the module M5 determines if a local octree-based structure $O_k$ is associated with said encompassing cube by optimizing a trade-off between a bit-rate $R_{k,n}$ for encoding a candidate octree-based structure $O_{k,n}$ approximating the geometry of points $P_{k,or}$ of the point cloud which are included in said encompassing cube, and a distortion $D_{k,n}$ taking into account spatial distances between, on one hand, said points $P_{k,or}$ of the point cloud which are included in said encompassing cube, and on the other hand, points $P_{k,n}$ which are included in leaf cubes associated with leaf nodes of the candidate octree-based structure $O_{k,n}$ together with points $P_{k,IP}$ of the inverse-projected point cloud IPPC which are included in said encompassing cube.

In step 250, the module M5 encodes a leaf node information data FLID indicating if a local octree-based structure $O_k$ has been determined for said encompassing cube;

if said leaf node information data FLID indicates that a local octree-based structure $O_k$ has been determined for said encompassing cube, in step 260, an octree information data SOID representative of said determined local octree-based structure $O_k$ is encoded; and in step 270, a leaf node information data SLID, indicating if a leaf cube of said local octree-based structure $O_k$ includes a point representative of a part of the point cloud, is encoded.

In the same manner, according to an embodiment of the decoding method, an encompassing cube, including at least one point representing at least a part of the point cloud to be decoded, is considered rather than a $LOU_k$. The global octree-based structure GO may then be equal to a single local octree-based structure $O_k$ (step 870).

The input point cloud IPC is then decoded as follows;

The steps 800 and 810 are cancelled.

In step 820, a leaf node information data FLID, indicating if a local octree-based structure $O_k$ has been determined for said encompassing cube, is decoded from a bitstream F1.

If said leaf node information data FLID indicates that a local octree-based structure $O_k$ has been determined for said encompassing cube, in step 820, an octree information data SOID representative of said determined local octree-based structure $O_k$, and a leaf node information data SLID, indicating if a leaf cube of said local octree-based structure $O_k$ includes a point representative of a part of the point cloud, are decoded from the bitstream F1;

in step 850, a local octree-based structure $O_k$ is obtained for said encompassing cube from said octree information data SOID;

in step 860; one determines if a leaf cube of said local octree-based structure $O_k$ includes a point of the point cloud to be decoded from said leaf node information data SLID, and in this case, adds (860) a leaf point to the leaf cube of said local octree-based structure Ok.

In step 880, the decoded point cloud RPC is obtained by fusing said inverse-projected point cloud IPPC and the global octree-based structure GO, which is equal to a single local octree-based structure $O_k$ in that case.

Figure 1B:

The decoded point cloud RPC is a point cloud reconstructed from said inverse-projected point cloud IPPC and said global octree-based structure GO. As mentioned in the introductory part of this patent application, this reconstructed point cloud may comprise uncompleted parts as illustrated by FIGS. 1a-b. These uncompleted parts may be generated due to the projection step (100) and/or to the rate distortion optimization RDO (step 150).

As visible on FIGS. 1a-1b, there are mainly two types of uncompleted parts totally missing parts in the inverse-projected point cloud IPPC, sparse parts around points of the octree-based structure GO.

According to the invention, these parts are completed depending on they are due to the inverse projection or to RDO.

According to the invention, missing parts among inverse-projected points are fulfilled by adding new points along lines connecting various inverse-projected points on the boundary of the missing parts. Regarding sparse parts, new points are added on a local tangent plane around under-sampled points of the octree-based structure GO. These processings are carried out in the module M17 (step 880) of the decoding method.

Figure 9:
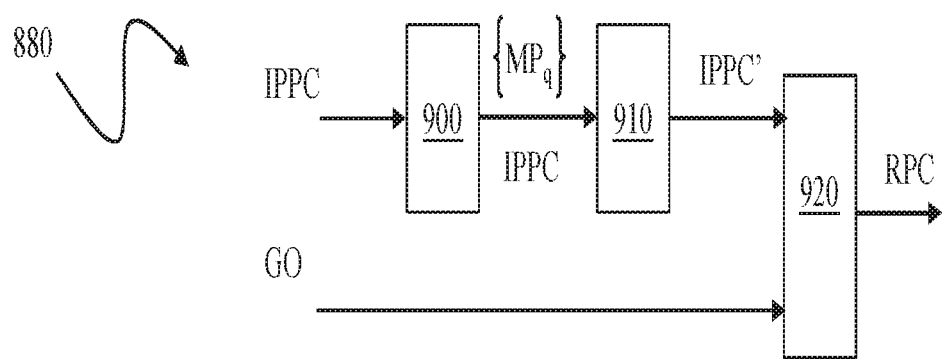
FIG. 9 shows a diagram of the sub-steps of the step 880 of FIG. 8 in accordance with an embodiment of the present principles.

FIG. 9 is a diagram of sub-steps of the step 880 according to a first embodiment.

In a step 900, at least one missing part $MP_1$ in the inverse-projected point cloud IPPC is detected.

In step 910, each missing part $MP_q$ is completed based on points in the neighborhood of said at least one missing part in order to generate a completed inverse-projected point cloud IPPC'.

In step 920, the completed inverse-projected point cloud IPPC' and the octree-based structure GO are fused to generate the reconstructed point cloud RPC.

In step 900, the missing parts $MP_q$ are detected by first detecting boundary points of these missing parts. This requires analyzing the neighborhood of each point of IPPC.

The distance-S neighbors of a point P is defined as the neighboring points falling on a sphere or a cube whose center is P and with sphere diameter or cube scale equal to 2*S. The distance-S neighborhood of a point $P(x_p, y_p, z_p)$ is defined by $$\{Neigh(x_{Neigh}, y_{Neigh}, z_{Neigh}), |x_{Neigh} - x_p| = S \&\& |y_{Neigh} - y_p| = S \&\& |z_{Neigh} - z_p| = S\}$$

wherein && is the logical operator AND.

Figure 10:
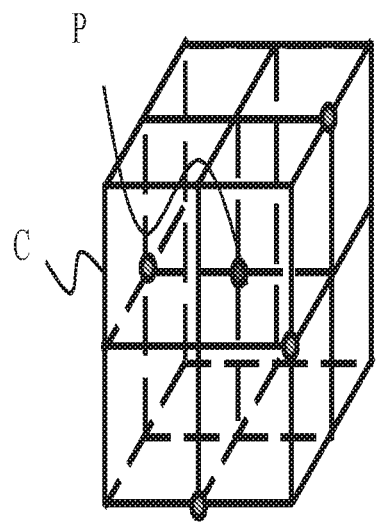
FIG. 10 illustrates the distance 1 neighborhood of a point.

The distance-1 neighborhood of a point P illustrated by FIG. 10. The points falling on the cube C are the point P's distance-1 neighbors. In this example, the point P comprises 4 points in its distance-1 neighborhood.

Figure 11:
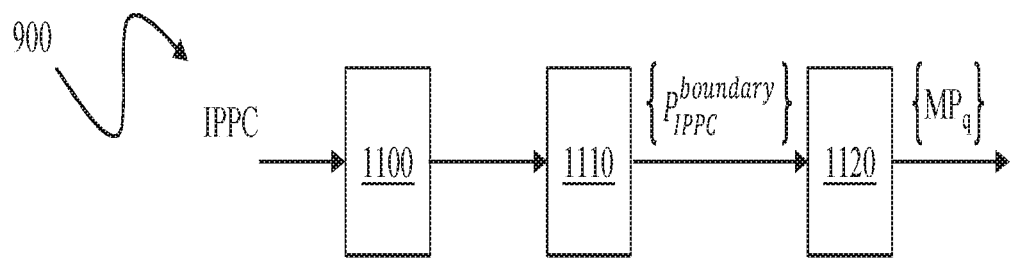
FIG. 11 shows an example of point cloud comprising two boundary point groups.

FIG. 11 is a diagram of sub-steps of the step 900 according to an embodiment.

In step 1100, boundary points are detected. Here the distance-$S^{Close}$ neighborhood of each point is checked. Without loss of generality, hereafter, $S^{Close}=1$. Points called boundary points $P_{IPPC}^{boundary}$, having a number $K_{P_{IPPC}}^{boundary^1}$ of neighbors in their distance-1 neighborhood with $T_{low}^1 < K_{P_{IPPC}}^{CB^1} < T_{high}^1$ are detected in the inverse-projected point cloud IPPC. The values $T_{low}^1$ and $T_{high}^1$ are predefined low and high thresholds.

The detected points $P_{IPPC}^{boundary}$ are considered as candidates of boundary points around the totally missing parts. In one example, $T_{low}^1=4$ and $T_{high}^1=7$. The thresholds $T_{low}^1$ and $T_{high}^1$ may depend on a required sampling rate.

Advantageously, an additional processing is applied to the boundary points $P_{IPPC}^{boundary}$ in step 1110. For each of the boundary points, the number of its distance 1 neighbors which are also boundary points is determined. If it is larger than a threshold $T_{Neigh}^{boundary}$, the boundary point is regarded as a real boundary point. Otherwise, the boundary point is considered as a false detected one. The threshold $T_{Neigh}^{boundary}$ is equal to or greater than 2. In one example, $T_{Neigh}^{boundary}$ is taken equal to 2.

In step 1120, a group of boundary points surrounding the missing part $MP_q$ is determined for each missing part.

The step 1120 consists in trying to find a boundary point group starting from each boundary point $P_{IPPC}^{boundary}$. The tracing boundary group method may be as follows.

Using $P_{IPPC}^{boundary}$ as the starting point and a step N, a boundary point group is growing as follows:

```
P_IPPC^boundary -> Boundary_Point_Group;
P_IPPC^boundary -> Queue_BoundaryPoint;
Mark P_IPPC^boundary as visited;
While (Queue_BoundaryPoint is not empty) {
    Pop P from Queue_BoundaryPoint;
    for each (P_Neighbor whose distance to P is equal or less than
N, which is also a boundary point and not marked as visited) {
        P_Neighbor -> Queue_BoundaryPoint;
        P_Neighbor -> Boundary_Point_Group;
        Mark P_Neighbor as visited;
    }
}
```

The value of the step N is for example equal to 2.

Figure 12:
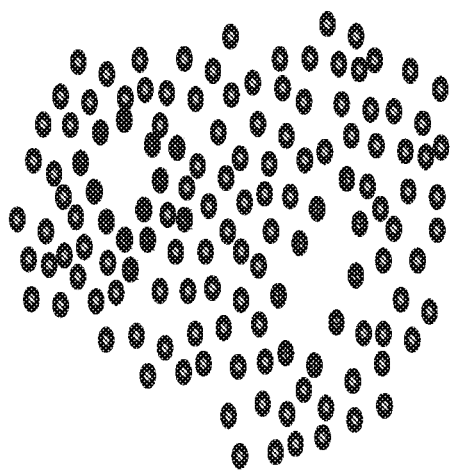
FIG. 12 shows a diagram of the sub-steps of the step 900 of FIG. 9 in accordance with an embodiment of the present principles.

An example of results of the step 1120 is illustrated by FIG. 12. In this example, two groups of boundary points are detected. The points with an inside x constitutes a first group of boundary points and the points with an inside + constitutes a second group of boundary points.

Then, in step 910, each missing part $MP_q$ delimited by a group of boundary points is completed based on points in the neighborhood of the missing part.

This completion may be carried out as follows.

Inside each boundary point group, new points along the lines connecting every two points are added.

In the following, we consider two boundary points in the current boundary point group $P_{Boundary}^1(x_{Boundary}^1, y_{Boundary}^1, z_{Boundary}^1)$ and $P_{Boundary}^2(x_{Boundary}^2, y_{Boundary}^2, z_{Boundary}^2)$. The procedure of adding new points may be as follows.

```
If |x_Boundary^1 - x_Boundary^2| < 2 or |y_Boundary^1 - y_Boundary^2| < 2 or
|z_Boundary^1 - z_Boundary^2| < 2 {
    P_Boundary^1 -> Queue_Point;
    P_Boundary^2 -> Queue_Point;
    do {
        Pop P^1 and P^2 from Queue_Point;
        Add P^M, the middle point of the P^1 and P^2 to the reconstructed
        point if the corresponding position is not occupied;
            if (the distance between P^1 and P^M is larger than 2)
                Add P^1 and P^M to Queue_Point;
            if (the distance between P^2 and P^M is larger than 2)
                Add P^2 and P^M to Queue_Point;
    }
}
```

The color or texture value of the added point $P^M$ is obtained by interpolation of the color or texture values of $P^1$ and $P^2$. The color interpolation may be executed in RGB, YUV or other color spaces. New points are thus added along lines connecting two points of the boundary point group until the distance between two points along the lines is lower than 2.

In another embodiment, the sparse parts around the points of the octree-based structure are also processed in order to improve the visual quality of the reconstructed point cloud RPC.

Figure 13:
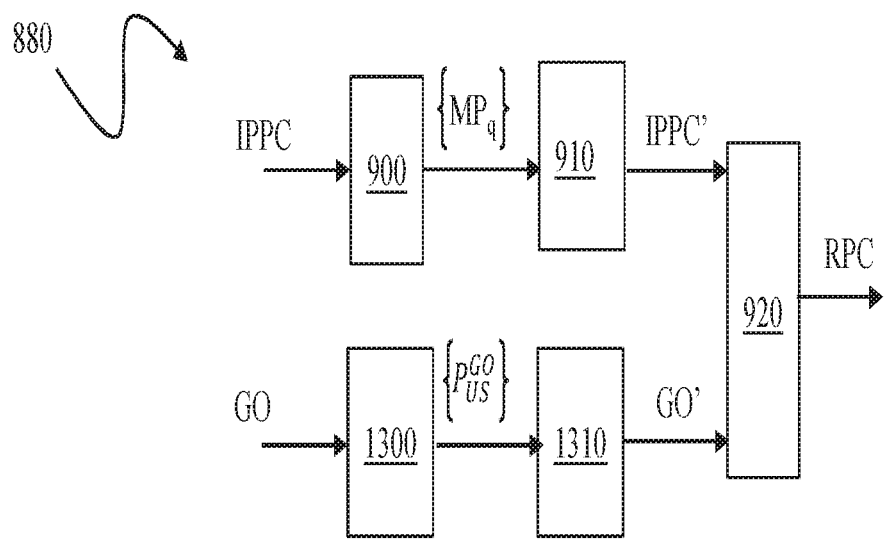
FIG. 13 shows a diagram of the sub-steps of the step 880 of FIG. 8 in accordance with another embodiment of the present principles.

In FIG. 13, the octree-based structure GO is completed aside from the completion of the inverse-projected point cloud IPPC.

The inverse-projected point cloud IPPC is processed as described in reference to FIG. 9 to generate the completed inverse-projected point cloud IPPC'.

The octree-based structure GO is processed as follows.

In step 1300, under-sampled points $P_{US}^{GO}$ are detected in the point cloud associated to the octree based structure. Here the distance-$S^{Close}$ neighborhood of each point is checked. Without loss of generality, hereafter, $S^{Close}=1$.

In step 1310, new points around the detected under-sampled points are added in order to generate an octree-based structure GO'.

According to an embodiment, the step (1300) of detecting under-sampled points consists in detecting, in the octree based structure GO, points having a number $K_P^{GO^1}$ of neighbors in their distance-1 neighborhood and a number of neighbors $K_P^{GO^{Sfurther}}$ in their distance-Sfurther neighborhood, $K_P^{GO^1}$ being lower than a threshold $T^1$ and $K_P^{GO^{Sfurther}}$ being greater than a threshold $T^{Sfurther}$ with Sfurther>1.

The detected points satisfying the two criteria ($K_P^{GO^1}<T^1$ and $K_P^{GO^{Sfurther}}>T^{Sfurther}$) are considered as under-sampled points.

The points satisfying only the first criterion ($K_{P^{GO}}^1 < T^1$) are not considered as under-sampled points $P_{US}^{GO}$ but as noisy or isolated points.

The values of the thresholds and neighborhood distance are for example:

$T^1 = 8$;
Sfurther=4;
$T^{Sfurther} = 9$;

In step 1310, new points around the detected under-sampled points $P_{US}^{GO}$ are added.

Figure 14:
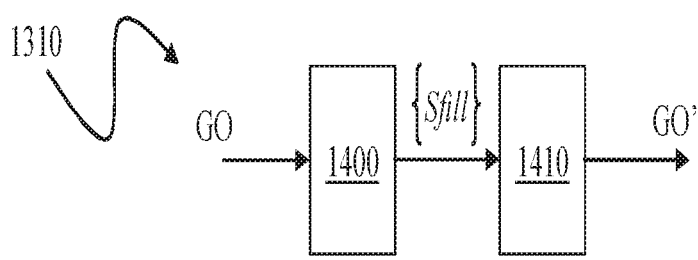
FIG. 14 shows a diagram of the sub-steps of the step 1310 of FIG. 13 in accordance with an embodiment of the present principles.

FIG. 14 shows sub-steps of step 1310.

In a step 1400, a distance Sfill of neighborhood in which adding new points is determined around each under-sampled point $P_{US}^{GO}$. In this step, if the neighborhood around a point is too sparse, the neighborhood distance wherein adding new points around $P_{US}^{GO}$ should be enlarged as follows. If $K_{P^{GO}}^1$ is lower than a predefined threshold $T^{1'}$, Sfill is set as the minimum neighborhood range that satisfies $K_{P_{US}^{GO}}^{Sfill} > T^{Sfill}$ where $T^{Sfill}$ is a predefined threshold for the neighborhood distance Sfill and $K_{P_{US}^{GO}}^{Sfill}$ is the number of points in distance-Sfill neighborhood of $P_{US}^{GO}$.

For each $P_{US}^{GO}$, the neighborhood distance Sfill is determined by $$= \begin{cases} 1 & \text{if } K_{P_{US}^{GO}}^1 > T^{1'} \\ \text{the minimum value that satisfies } K_{P_{US}^{GO}}^{Sfill} > T^{Sfill} & \text{if } K_{P_{US}^{GO}}^1 \leq T^{1'} \end{cases}$$

wherein $T^1 > T^{1'}$.

In one example, $T^{1'} = 2$ and $T^{Sfill} = 8$.

In step 1410, all the non-occupied positions within the distance-Sfill neighborhood of the under-sampled point may be filled with a point. The color or texture value of the point may be computed by interpolation of the color or texture values of its neighbors.

Advantageously, all the non-occupied positions within the distance-Sfill neighborhood of the under-sampled point are not filled with a point, but only a part of them.

Each of the non-occupied positions within a bounding-box (cube) whose center is $P_{US}^{GO}$ and size is 2Sfill*2Sfill*2Sfill is considered as a candidate new point to be added to the reconstructed point cloud. The point inserted to a non-occupied position is denoted hereinafter $P_{UnOccup}^i$. The possibility of $P_{UnOccup}^i$ to be inserted around $P_{US}^{GO}$ is determined based on conditions on 2 factors mentioned hereinafter.

A first factor is the distance between $P_{UnOccup}^i$ and the local plane tangent to $P_{US}^{GO}$: $Dis_{Tang}^i = |(P_{UnOccup}^i - Mean_{P_{US}^{GO}}) \cdot Normal_{P_{US}^{GO}}|$ where $Mean_{P_{US}^{GO}}$ and $Normal_{P_{US}^{GO}}$ are the mean and normal of $P_{US}^{GO}$.

Denote all the existing neighbors of $P_{US}^{GO}$ within the neighborhood range Sfill as $$NN_{S_{Fill}} = \left\{ Neigh_{NN_{S_{Fill}}}^i (x_{Neigh}, y_{Neigh}, z_{Neigh}), |x_{Neigh} - x_p| \leq S_{Fill} \&\& |y_{Neigh} - y_p| \leq S_{Fill} \&\& |z_{Neigh} - z_p| \leq S_{Fill} \right\}.$$

$Mean_{P_{US}^{GO}}$ is the mean point of $NN_{S_{Fill}}$. And $Normal_{P_{US}^{GO}}$ is calculated as follows. Every three different points in $NN_{S_{Fill}}$ forms a triangle. $Normal_{P_{Undersampled}}^{Residual}$ is the mean of the normal of all these triangles.

This first factor represents how close $P_{UnOccup}^i$ is to the underlying local surface around $P_{US}^{GO}$ represented by the point cloud. The higher $Dis_{Tang}^i$ is, the less possible that $P_{US}^{GO}$ is added to the point cloud.

A second factor is the change of the distance between a distance-$S_{Large}$ neighborhood of $P_{US}^{GO}$ and $NN_{S_{Fill}}$ if the point $P_{UnOccup}^i$ is inserted, denoted as DisChange$_{Neighborhood}^i$.

The distance between distance-$S_{Large}$ neighborhood of $P_{US}^{GO}$ and $NN_{S_{Fill}}$ is defined by $$Dis_{Neighborhood} = \sum_{\{Neigh_{S_{Large}}^a\}} \min_{\{Neigh_{NN_{S_{Fill}}}^b\}} \left( \| Neigh_{S_{Large}}^a - Neigh_{NN_{S_{Fill}}}^b \| \right)$$

where $\{Neigh_{S_{Large}}^a\}$ is the distance-$S_{Large}$ neighborhood of $P_{US}^{GO}$.

DisChange$_{Neighborhood}^i$ is defined by $$DisChange_{Neighborhood}^i = Dis_{Neighborhood} - Dis'_{Neighborhood}$$

where $Dis_{Neighborhood}$ and $Dis'_{Neighborhood}$ are the distances between distance-$S_{Large}$ neighborhood of $P_{US}^{GO}$ and $NN_{S_{Fill}}$ before and after $P_{UnOccup}^i$ is added to the point cloud.

Note that the value of DisChange$_{Neighborhood}^i$ is not negative. This factor quantifies how $P_{UnOccup}^i$ can help connect the distance-$S_{Large}$ neighborhood of $P_{US}^{GO}$ and $NN_{S_{Fill}}$. The higher DisChange$_{Neighborhood}^i$ is, the more possible that $P_{UnOccup}^i$ is added.

According to the invention, $P_{UnOccup}^i$ is added to the reconstructed point cloud if $Dis_{Tang}^i < Thres_{Tangent}$ and DisChange$_{Neighborhood}^i > Thres_{NeighDisChange}$. The possible values are $Thres_{Tangent} = 1.0$ and $Thres_{NeighDisChange} = 1$.

As a variant, $Mean_{P_{US}^{GO}}$ is used instead of $P_{US}^{GO}$ when determining the candidate new points. This is to further avoid adding new points around noisy/isolated points.

Figure 15:
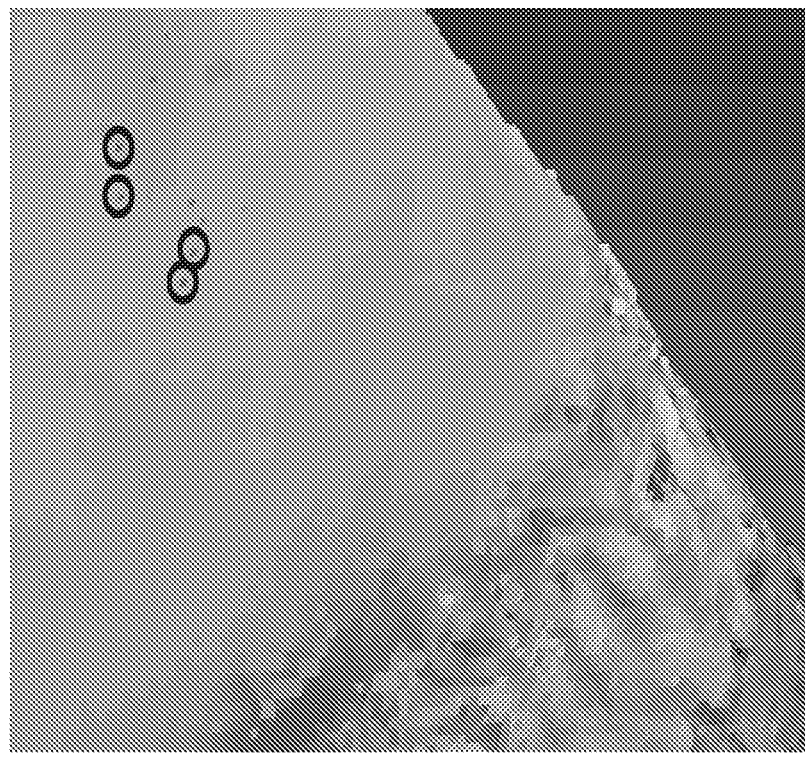
FIG. 15 is an example of reconstructed point cloud wherein tiny holes are present.

After the two above-described processings on the inverse-project point cloud IPPC and on the octree-based structure GO, some tiny holes left may still remained, as shown in FIG. 15. Although only one point is needed to fill each of these tiny holes, this artefact may be visually very annoying. These tiny holes correspond to some points having no complete plane in their distance-1 neighborhood.

Figure 16:
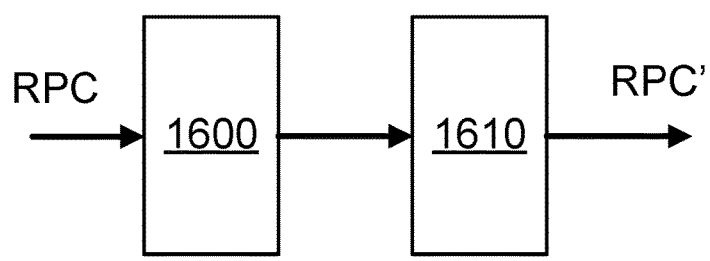
FIG. 16 shows a diagram of steps for processing the tiny holes.

These tiny holes have to be detected and then to be completed. FIG. 16 describes additional steps for detecting and completing these holes.

In step 1600, points without complete plane in their distance-$S^{Close}$ neighborhood are detected in the reconstructed point cloud RPC. Without loss of generality, hereafter, $S^{Close} = 1$.

Figure 17:
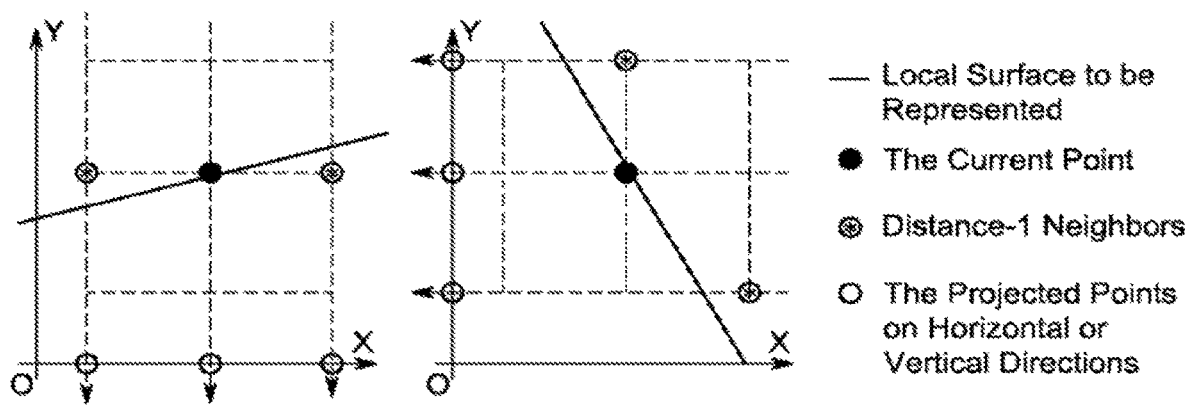
FIG. 17 illustrates a step for detecting the tiny holes.

As the point cloud represents surface models in most cases, for each point, at least one of the projections of the distance-1 neighbors of each point on the XOY, YOZ and XOZ planes should cover a large part of the corresponding 3×3 square on the corresponding planes. That is to say, for a point with complete distance-1 neighborhood, among the 3 projections which project its distance-1 neighbors onto the XOY, YOZ and XOZ planes, at least one projection generates a group of non-overlapped projected distance-1 neighbors whose number is greater than a predefined threshold $Thres_{CompleNeighh}$. For example, $Thres_{CompleNeighh} = 9$, which means that the corresponding 3×3 square on the corresponding planes should be fully covered. FIG. 17 shows examples in 2D. If none of the 3 projections can fully cover a 3×3 square, the distance-1 neighborhood of the point is regarded as having no complete plane.

So, in a first embodiment, in step 1600, points having none of their 3 projections of the distance-1 neighbors on the XOY, YOZ and XOZ planes covering a 3×3 square is considered as points without complete plane in their distance-1 neighborhood.

In step 1610, the distance-1 neighborhood of the points detected in step 1600 are completed.

Figure 18:
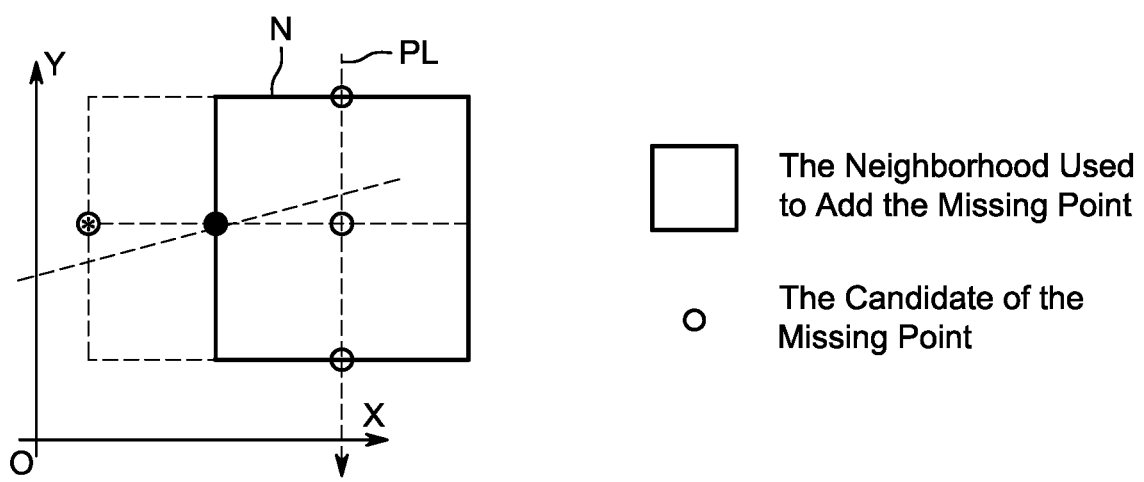
FIG. 18 illustrates a step for completing the tiny holes.

Firstly, the projection direction with maximum number of projected points on the projection plane is selected. Such a projection direction is for example the Y direction as shown in FIG. 18. Secondly, along each of the projection line PL where the corresponding projected point is missing, a point is added in the position among the 3 candidate un-occupied positions which is closest to the mean position of the points falling into the 3×3×3 neighborhood N of the projection line PL.

Thus, new points are added in step 1610 to make the distance 1 neighborhood of each point of RPC complete. The completed RPC is denoted RPC'.

As for the other processings, the color of the new points is determined by color interpolation of the nearby existing points.

In a particular embodiment, when a new point is going to be added, the colors of the nearby points are compared. If the colors of the neighbor points are very different, the new point is not added.

The distance-1 neighborhood of each point of RPC can be completed according to a second embodiment.

In this second embodiment, instead of checking the distance-1 neighborhood of each existing point (first embodiment), the distance-1 neighborhood of each non-occupied position is checked. Denote each non-occupied occupied position as $P^{UnOccup}(x^{UnOccup}, y^{UnOccup}, z^{UnOccup})$.

For each $P^{UnOccup}$, check the number of its distance 1 neighbors in the current point cloud, which is denoted as $K_{P^{UnOccup}}^1$. If $K_{P^{UnOccup}}^1$ is within a reasonable range, in the other words, less than the usual value of $K_P^1$ when the distance 1 neighborhood of P is complete and greater than a lower bound, $P^{UnOccup}$ is possible to be a new point and be added to the point cloud. In this case, $P^{UnOccup}$ is further checked. That is to say, if $T_{UnOccup}^{1a} < K_{P^{UnOccup}}^1 < T_{UnOccup}^{1b}$, $P^{UnOccup}$ is further checked. Otherwise, $P^{UnOccup}$ is not further checked. The possible values are $T_{UnOccup}^{1a}=13$ and $T_{UnOccup}^{1b}=5$.

If $P^{UnOccup}$ is further checked, positions along the following line are checked:

$$\begin{cases} x^{UnOccup} - RANGE < x < x^{UnOccup} + RANGE \\ y = y^{UnOccup} \\ z = z^{UnOccup} \end{cases}$$

The possible value of RANGE is 3. If no position along the line described above is occupied, a square with two corner points as $(x^{UnOccup}, y^{UnOccup}-RANGE_{Square}, z^{UnOccup}-RANGE_{Square})$ and $(x^{UnOccup}, y^{UnOccup}+RANGE_{Square}, z^{UnOccup}+RANGE_{Square})$ is further checked. If the number of occupied positions within said square is larger than a predefined threshold $T_{UnOccup}^{1c}$, a new point along the line is added to the point cloud. The possible value is $T_{UnOccup}^{1c}=6$. The new point to be added is $P^{New}(x^{New}, y^{UnOccup}, z^{UnOccup})$, where $x^{New}$ is the value of $x^i$ which makes $P^i(x^i, y^{UnOccup}, z^{UnOccup})$ have the maximum number of distance-1 neighbors among $x^{UnOccup}-RANGE < x^i < x^{UnOccup}+RANGE$.

If a new point has been added around $P^{UnOccup}$ at this stage, the completion algorithm moves on to check the other unoccupied positions of the current point cloud. Otherwise, $P^{UnOccup}$ is further checked as follows.

Positions along the following line are checked:

$$\begin{cases} y^{UnOccup} - RANGE < y < y^{UnOccup} + RANGE \\ x = x^{UnOccup} \\ z = z^{UnOccup} \end{cases}$$

If no position along the above described line is occupied, a square with two corner points as $(x^{UnOccup}-RANGE_{Square}, y^{UnOccup}, z^{UnOccup}-RANGE_{Square})$ and $(x^{UnOccup}+RANGE_{Square}, y^{UnOccup}, z^{UnOccup}+RANGE_{Square})$ is further checked. If the number of occupied positions within said square is larger than $T_{UnOccup}^{1c}$, a new point along this line is added to the point cloud. The new point to be added is $P^{New}((x^{UnOccup}, y^{New}, z^{UnOccup})$, where $y^{New}$ is the value of $y^i$ which makes $P^i(x^{UnOccup}, y^i, z^{UnOccup})$ have the maximum number of distance-1 neighbors among $y^{UnOccup}-RANGE < y^i < y^{UnOccup}+RANGE$.

If a new point has been added around $P^{UnOccup}$ at this stage, the completion algorithm moves on to check the other unoccupied positions of the current point cloud. Otherwise, $P^{UnOccup}$ is further checked as follows.

The positions along the following line are checked:

$$\begin{cases} z^{UnOccup} - RANGE < z < z^{UnOccup} + RANGE \\ x = x^{UnOccup} \\ y = y^{UnOccup} \end{cases}$$

If no position along the line described above is occupied, a square with two corner points as $(x^{UnOccup}-RANGE_{Square}, y^{UnOccup}-RANGE_{Square}, z^{UnOccup})$ and $(x^{UnOccup}+RANGE_{Square}, y^{UnOccup}+RANGE_{Square}, z^{UnOccup})$ is further checked. If the number of occupied positions within said square is larger than $T_{UnOccup}^{1c}$, a new point along this line is added to the point cloud. The new point to be added is $P^{New}((x^{UnOccup}, y^{UnOccup}, z^{New})$, where $z^{New}$ is the value of $z^i$ which makes $P^i(x^{UnOccup}, y^{UnOccup}, z^i)$ have the maximum number of distance-1 neighbors among $z^{UnOccup}-RANGE < z^i < z^{UnOccup}+RANGE$.

Then the completion algorithm moves on to check the other unoccupied positions of the current point cloud.

On FIG. 1-18, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 19:
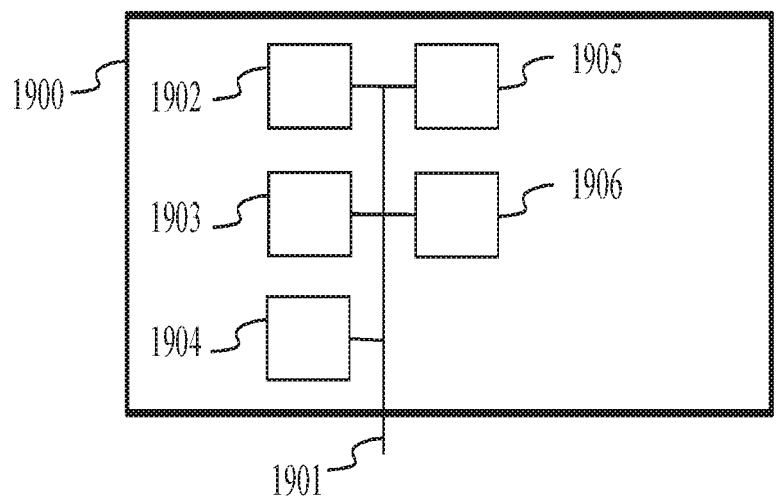
FIG. 19 shows an example of an architecture of a device in accordance with an example of present principles.

FIG. 19 represents an exemplary architecture of a device 1900 which may be configured to implement a method described in relation with FIG. 1-18.

Device 1900 comprises following elements that are linked together by a data and address bus 1901:
- a microprocessor 1902 (or CPU), which is, for example, a DSP (or Digital Signal Processor);
- a ROM (or Read Only Memory) 1903;
- a RAM (or Random Access Memory) 1904;
- an I/O interface 1905 for reception of data to transmit, from an application; and
- a battery 1906.

In accordance with an example, the battery 1906 is external to the device. In each of mentioned memory, the word «register»» used in the specification can correspond to area of small capacity (some bits) or to very large area (e.g. a whole program or large amount of received or decoded data). The ROM 1903 comprises at least a program and parameters. The ROM 1903 may store algorithms and instructions to perform techniques in accordance with present principles. When switched on, the CPU 1902 uploads the program in the RAM and executes the corresponding instructions.

RAM 1904 comprises, in a register, the program executed by the CPU 1902 and uploaded after switch on of the device 1900, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the input point cloud IPC is obtained from a source. For example, the source belongs to a set comprising:
- a local memory (1903 or 1904), e.g. a video memory or a RAM (or Random Access Memory), a flash memory, a ROM (or Read Only Memory), a hard disk;
- a storage interface (1905), e.g. an interface with a mass storage, a RAM, a flash memory, a ROM, an optical disc or a magnetic support;
- a communication interface (1905), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded colored point cloud CPC is sent to a destination; specifically, the destination belongs to a set comprising:
- a local memory (1903 or 1904), e.g. a video memory or a RAM, a flash memory, a hard disk;
- a storage interface (1905), e.g. an interface with a mass storage, a RAM, a flash memory, a ROM, an optical disc or a magnetic support;
- a communication interface (1905), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface);
- a rendering device; and
- a display.

In accordance with examples of encoding or encoder, the bitstream F1-F2 are sent to a destination. As an example, at least one of bitstreams F1-F2 is stored in a local or remote memory, e.g. a video memory (1904) or a RAM (1904), a hard disk (1903). In a variant, at least one of bitstreams F1-F3 is sent to a storage interface (1905), e.g. an interface with a mass storage, a flash memory, ROM, an optical disc or a magnetic support and/or transmitted over a communication interface (1905), e.g. an interface to a point to point link, a communication bus, a point to multipoint link or a broadcast network.

In accordance with examples of decoding or decoder, at least one of bitstreams F1-F2 is obtained from a source. Exemplarily, a bitstream is read from a local memory, e.g. a video memory (1904), a RAM (1904), a ROM (1903), a flash memory (1903) or a hard disk (1903). In a variant, the bitstream is received from a storage interface (1905), e.g. an interface with a mass storage, a RAM, a ROM, a flash memory, an optical disc or a magnetic support and/or received from a communication interface (1905), e.g. an interface to a point to point link, a bus, a point to multipoint link or a broadcast network.

In accordance with examples, device 1900 being configured to implement an encoding method described in relation with FIG. 1-7, belongs to a set comprising:
- a mobile device;
- a smartphone or a TV set with 3D capture capability;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

In accordance with examples, device 1900 being configured to implement a decoding method described in relation with FIG. 8, belongs to a set comprising:
- a mobile device;
- a Head Mounted Display (HMD);
- (mixed reality) smartglasses;
- an holographic device;
- a communication device;
- a game device;
- a set top box;
- a TV set;
- a tablet (or tablet computer);
- a laptop;
- a display;
- a stereoscopic display; and
- a decoding chip.

Figure 20:
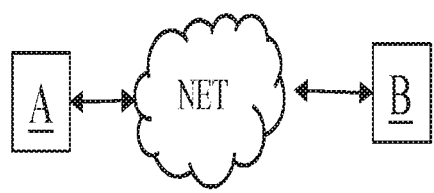
FIG. 20 shows two remote devices communicating over a communication network in accordance with an example of present principles.
Figure 21:
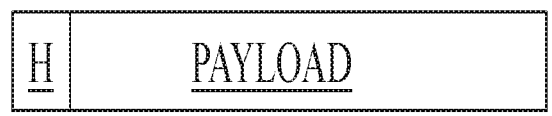
FIG. 21 shows the syntax of a signal in accordance with an example of present principles.

According to an example of the present principles, illustrated in FIG. 20, in a transmission context between two remote devices A and B over a communication network NET, the device A comprises a processor in relation with memory RAM and ROM which are configured to implement a method for encoding a point cloud as described in relation with the FIGS. 1-18 and the device B comprises a processor in relation with memory RAM and ROM which are configured to implement a method for decoding as described in relation with FIGS. 20-21.

In accordance with an example, the network is a broadcast network, adapted to broadcast encoded colored point clouds from device A to decoding devices including the device B.

A signal, intended to be transmitted by the device A, carries at least one of bitstreams F1-F2.

This signal may thus carry on at least one depth image $DI_{i,j}$ and, optionally, a texture image $TI_{i,j}$ associated with each depth image, obtained by projecting points of a input point cloud IPC onto a face $F_{i,j}$ of an octree-based structure of projection, and projection information data representative of the faces and optionally representative of the octree-based structure of projection.

The signal may carry a first octree information data FOID representative of the octree-based structure IO.

The signal may also carry, for each $LOU_k$, associated with the leaf nodes of said octree-based structure IO, a first leaf node information data FLID indicating if a local octree-based structure $O_k$ has been determined for said $LOU_k$.

The signal may also carry a second octree information data SOID representative of a local octree-based structure $O_k$, and a second leaf node information data SLID indicating if a leaf cube of said local octree-based structure $O_k$ includes a point representative of a part of the input point cloud IPC.

FIG. 21 shows an example of the syntax of such a signal when the data are transmitted over a packet-based transmission protocol. Each transmitted packet P comprises a header H and a payload PAYLOAD.

According to embodiments, the payload PAYLOAD may comprise at least one of the following elements:
 bits representative of at least one pair of one texture image $TI_{i,j}$ and one depth image $DI_{i,j}$;
 at least one binary flag representative of the first octree information data FOID;
 at least one binary flag representative of the second octree information data SOID;
 at least one bit representative of a maximum depth of the cube splitting;
 at least one binary flag representative of the first leaf node information data FLID;
 at least one binary flag representative of the second leaf node information data SLID;
 bits representative of an encoded image I.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a FDA, a HMD, smart glasses, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
reconstructing a point cloud representing a 3D object from an inverse-projected point cloud obtained by inverse-projecting at least one depth image of an original point cloud, said at least one depth image being obtained by projecting the points of the original point cloud onto at least one surface, said reconstructing comprising:
determining a group of points called boundary points surrounding a missing part in the inverse-projected point cloud, and
completing said missing part by, for every two boundary points in said group of boundary points, adding at least one point along a line connecting two boundary points of said group of boundary points.

2. The method of claim 1, wherein the boundary points are points having a number of neighbors in their distance-$S^{close}$ neighborhood lower than a predefined high threshold and greater than a predefined low threshold.

3. The method of claim 1, further comprising, before determining a group of boundary points surrounding said missing part, removing the boundary points having less than a predefined number of boundary points in their distance-$S^{close}$ neighborhood.

4. The method of claim 3, wherein said predefined number of boundary points is greater than or equal to $S^{close}+1$.

5. The method of claim 1, wherein the point cloud is also reconstructed from a point cloud associated to an octree based structure representative of said original point cloud.

6. The method of claim 5, further comprising:
detecting, in the point cloud associated to the octree based structure, under-sampled points, and
adding new points around the detected under-sampled points.

7. The method of claim 6, wherein detecting under-sampled points comprises:
detecting, in the point cloud associated to the octree based structure, points having a number of neighbors in their distance-$S^{close}$ neighborhood lower than a predefined threshold and a number of neighbors in their distance-Sfurther neighborhood greater than a predefined threshold, with Sfurther>$S^{close}$ and wherein the detected points are the under-sampled points.

8. The method or device of claim 6, wherein adding new points around the detected under-sampled points comprises:
determining, for each under-sampled point, a minimal distance-Sfill neighborhood in which a number of points is greater than a predefined threshold, and
filling the minimal distance-Sfill neighborhood of the under-sampled point by at least one new point.

9. The method of claim 8, wherein the minimal distance Sfill is equal to 1 when the number of points in the distance-$S^{close}$ neighborhood of the under-sampled point is greater than a predetermined threshold.

10. The method of claim 1, further comprising detecting points of the reconstructed point cloud which lack a complete plane in their distance-$S^{close}$ neighborhood and adding at least one point in the distance-$S^{close}$ neighborhood in order to have a complete plane.

11. The method of claim 10, wherein the detection of points which lack a complete plane comprises:
projecting the incomplete plane of the point's distance-$S^{close}$ neighbors on XOY, YOZ and XOZ planes,
checking the numbers of three groups of non-overlapped projected distance-$S^{close}$ neighbors resultant from said 3 projections, and
determining that, among said three groups of non-overlapped projected distance-$S^{close}$ neighbors, none of them has a number of non-overlapped points greater than a predetermined threshold.

12. The method of claim 11, wherein at least one new point is added around a point which has an incomplete plane, to complete said incomplete plane.

13. The method of claim 12, wherein said at least one new point is decided by:
determining a projection from said 3 projections which corresponds to the biggest number of non-overlapped projected points among said 3 projections, and
adding at least one new point along the projection line where the projected point on the corresponding incomplete plane is missing.

14. The method of claim 11, wherein the incomplete planes around points are completed by:
checking the number of the distance-$S^{close}$ neighbors of each non-occupied position,
determining non-occupied positions to be further processed in step 1, whose number of the distance-$S^{close}$ neighbors is larger than a predetermined threshold and smaller than a predetermined threshold, and
adding new points around said non-occupied positions.

15. The method of claim 1, wherein the inverse-projected point cloud is also obtained by inverse-projecting at least one texture image of the original point cloud, said at least one texture image being also obtained by projecting the points of the original point cloud onto at least one surface.

16. An apparatus comprising a memory and one or more processors configured to:
reconstruct a point cloud representing a 3D object from an inverse-projected point cloud obtained by inverse-projecting at least one depth image of an original point cloud, said at least one depth image being obtained by projecting the points of the original point cloud onto at least one surface, said one or more processors being further configured to:
determine a group of points called boundary points surrounding a missing part in the inverse-projected point cloud, and
complete said missing part by, for every two boundary points in said croup of boundary points, adding at least one point along a line connecting two boundary points of said group of boundary points.

17. The apparatus of claim 16, wherein the boundary points are points having a number of neighbors in their distance-$S^{close}$ neighborhood lower than a predefined high threshold and greater than a predefined low threshold.

18. The apparatus of claim 16, wherein the one or more processors are further configured, before determining a group of boundary points surrounding said missing part (MPq), to remove the boundary points having less than a predefined number of boundary points in their distance-$S^{close}$ neighborhood.

19. The apparatus of claim 18, wherein said predefined number of boundary points is greater than or equal to $S^{close}+1$.

20. The apparatus of claim 16, wherein the point cloud is also reconstructed from a point cloud associated to an octree based structure representative of said original point cloud.

21. The apparatus of claim 20, wherein the one or more processors are further configured to detect, in the point cloud associated to the octree based structure, under-sampled points, and adding new points around the detected under-sampled points.

22. The apparatus of claim 21, wherein the inverse-projected point cloud is also obtained by inverse-projecting at least one texture image of the original point cloud, said at least one texture image being also obtained by projecting the points of the original point cloud onto at least one surface.

23. The apparatus of claim 21, wherein the one or more processors are further configured, for adding new points around the detected under-sampled points, to:
- determine, for each under-sampled point, a minimal distance-Sfill neighborhood in which a number of points is greater than a predefined threshold, and
- fill the minimal distance-Sfill neighborhood of the under-sampled point by at least one new point.

* * * * *